(12) United States Patent
Sasaki et al.

(10) Patent No.: US 7,680,122 B2
(45) Date of Patent: Mar. 16, 2010

(54) COMMUNICATION METHOD FOR DATA COMMUNICATION BASED ON POINT-TO-POINT PROTOCOL

(75) Inventors: Keizaburo Sasaki, Yokosuka (JP); Hiroyuki Hattori, Yokohama (JP); Noriko Niizato, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 806 days.

(21) Appl. No.: 11/383,186

(22) Filed: May 12, 2006

(65) Prior Publication Data

US 2006/0193341 A1      Aug. 31, 2006

Related U.S. Application Data

(62) Division of application No. 09/667,084, filed on Sep. 21, 2000, now Pat. No. 7,260,107.

(30) Foreign Application Priority Data

Sep. 21, 1999   (JP)   ................................. 11-266862
Apr. 19, 2000   (JP)   ............................. 2000-118620

(51) Int. Cl.
*H04L 12/56* (2006.01)
*G06F 15/16* (2006.01)

(52) U.S. Cl. ................................... 370/395.2; 709/237

(58) Field of Classification Search .................. None
See application file for complete search history.

(56) References Cited

U.S. PATENT DOCUMENTS

| | | | | |
|---|---|---|---|---|
| 4,607,364 A | 8/1986 | Neumann et al. | ............. | 370/99 |
| 4,792,940 A | 12/1988 | Hiraguchi | .................. | 370/32.1 |
| 5,627,829 A | 5/1997 | Gleeson et al. | ............. | 370/230 |
| 5,666,362 A | 9/1997 | Chen et al. | .................. | 370/420 |
| 5,768,525 A * | 6/1998 | Kralowetz et al. | .......... | 709/228 |
| 5,781,726 A * | 7/1998 | Pereira | ........................ | 709/200 |
| 5,870,540 A | 2/1999 | Wang et al. | ............. | 395/183.19 |
| 5,978,386 A | 11/1999 | Hamalainen et al. | ........ | 370/466 |
| 6,118,785 A | 9/2000 | Araujo et al. | ................ | 370/401 |
| 6,233,248 B1 * | 5/2001 | Sautter et al. | ................ | 370/465 |
| 6,320,874 B1 | 11/2001 | Crump et al. | ................ | 370/466 |

(Continued)

FOREIGN PATENT DOCUMENTS

EP      0378400 A2      7/1990

(Continued)

OTHER PUBLICATIONS

Nishihara Jun-Ichiro, et al.: Method for Achieving PPP Features in ATM Access Network, The Institute of Electronics, Information and Communication Engineers (IEICE), The 1997 Proceedings of the IEICE General Conference, Communications (2), B-7-119, p. 248 (Mar. 1997) (PDF enclosed entitled Document 1, 6 pages.).

(Continued)

*Primary Examiner*—Gregory B Sefcheck
(74) *Attorney, Agent, or Firm*—Workman Nydegger

(57) ABSTRACT

A communication method in a third communication apparatus of a first node located between a first communication apparatus of the first node and a second communication apparatus of a second node, the first communication apparatus and the second communication apparatus performing data communication based on PPP.

2 Claims, 24 Drawing Sheets

| ADDITIONAL INFORMATION | ADDRESS | CONTROL | PROTOCOL | INFORMATION | FCS |
|---|---|---|---|---|---|

U.S. PATENT DOCUMENTS

| | | | |
|---|---|---|---|
| 6,370,118 B1 | 4/2002 | Lioy et al. | 370/235 |
| 6,438,137 B1 | 8/2002 | Turner et al. | 370/466 |
| 6,449,272 B1 * | 9/2002 | Chuah et al. | 370/389 |
| 6,480,493 B1 * | 11/2002 | Christie et al. | 370/395.2 |
| 6,483,822 B1 | 11/2002 | Lioy et al. | 370/329 |
| 6,487,218 B1 | 11/2002 | Ludwig et al. | 370/469 |
| 6,507,566 B1 | 1/2003 | Noda et al. | 370/310 |
| 6,577,643 B1 * | 6/2003 | Rai et al. | 370/466 |
| 6,721,333 B1 | 4/2004 | Milton et al. | 370/469 |
| 6,754,181 B1 | 6/2004 | Elliott et al. | 370/252 |
| 6,847,614 B2 * | 1/2005 | Banker et al. | 370/252 |
| 6,856,618 B2 * | 2/2005 | Strathmeyer et al. | 370/356 |
| 6,917,600 B1 * | 7/2005 | Chuah et al. | 370/328 |
| 2008/0016231 A1 * | 1/2008 | Itabashi et al. | 709/229 |

FOREIGN PATENT DOCUMENTS

| | | |
|---|---|---|
| EP | 0639904 A2 | 8/1994 |
| EP | 0933898 A1 | 8/1999 |
| EP | 094569 A2 | 9/1999 |
| GB | 2327829 A | 2/1999 |
| JP | 08-102761 | 4/1996 |
| JP | 08-274838 | 10/1996 |
| JP | 09-307580 | 11/1997 |
| JP | 09326819 A | 12/1997 |
| JP | 10-023003 | 1/1998 |
| JP | 10-173708 | 6/1998 |
| JP | 10-262060 | 9/1998 |
| JP | 10-512120 | 11/1998 |
| JP | 10-322361 | 12/1998 |
| JP | 10-322399 | 12/1998 |
| JP | 11-027740 | 1/1999 |
| JP | 11-074992 | 3/1999 |
| JP | 11136240 A | 5/1999 |
| JP | 2000-209920 | 8/2000 |
| WO | WO95/34153 | 12/1995 |
| WO | WO97/05726 | 2/1997 |
| WO | WO98/39934 | 9/1998 |
| WO | WO99/26387 | 5/1999 |

OTHER PUBLICATIONS

Japanese Official Notice of Rejection, Reference No. 2004P00446, Patent Application No. 2004-353434, Mailing No. 037077, Mailing Date Jan. 26, 2007 (PDF enclosed entitled Document 1, 7 pages.).
The Point-to-Point Protocol Network Working Group, W. Simpson, Jul. 1994, pp. 1-52 (*attached hereto as Article 1*).
PPP in HDLC-Like Framing Network Working Group, W. Simpson, Jul. 1994, pp. 1-25 (*attached hereto as Article 2*).
PPP LCP Internationalization Configuration Option Network Working Group, G. Zorn, Jan. 1999, pp. 1-5 (*attached hereto as Article 3*).
TSG-RAN Working Group 2, TSGR2#7(99)b70 Malmo, Sweden, Sep. 20 to 24, 1999 (*attached hereto as Article 4*).
3GTS23.060 V3.3.0, Apr. 2000; 3$^{rd}$ Generation Partnership Project; Technical Specification Group Services and System Aspects; General Packet Radio Service (GPRS); Service description; Stage 2 (Release 1999), pp. 146-147 (*attached hereto as Article 5*).
Astrolink Satellite System Overview Eduardo Elizondo, Richard Gobbi and Anthony Modelfino; 1998 IEEE pp. 539-546 (*attached hereto as Article 6*).
XP-000870423; A Simple Data Link Protocol for High-Speed Packet Networks, Bharat T. Doshi, Subrahmanyam Dravida, Enrique J. Herandez-Valencia, Wasim A. Matragi, M. Akber Qureshi, Jon Anderson, and James S. Manchester, Jan.-Mar. 1999, pp. 85-104 (*attached hereto as Article 7*).
XP-002324214, The Point-to-Point Protocol (PPP); W. Simpson, Jul. 1994 pp. 1-52 (*attached hereto as Article 8*).
Official Notice of Rejection; Case No. DCMH110457; Patent Application No. 2000-118620 (*attached hereto as Article 9*).
Official Notice of Rejection; Case No. DCMH110179; Patent Application No. 11-266862 (*attached hereto as Article 10*).
Austrian Patent Office Service and Information Sector (TRF); Search Report (Supplementary); Singapore Patent Application No. 200005369-4 (*attached hereto as Article 11*).
Austrian Patent Office Service and Information Sector (TRF); Search Report; Singapore Patent Application No. 200005369-4 (*attached hereto as Article 12*).

\* cited by examiner

| FLAG | ADDRESS | CONTROL | PROTOCOL | INFORMA-TION | FCS |

FIG.1

(PRIOR ART)

| ADDITIONAL INFORMATION | ADDRESS | CONTROL | PROTOCOL | INFORMATION | FCS |

FIG.3

COMMUNICATION METHOD FOR DATA COMMUNICATION BASED ON POINT-TO-POINT PROTOCOL

CROSS-REFERENCE TO RELATED APPLICATIONS

This application is a divisional application of commonly assigned, co-pending U.S. patent application Ser. No. 09/667,084, filed Sep. 21, 2000 and entitled "Data Conversion Apparatus, Signal, Data Conversion Method, DCE, Gateway and Communication Apparatus", which application is incorporated herein by reference in its entirety. That patent application claims priority to Japanese Patent Application Nos. 11-266862 filed Sep. 21, 1999 and Japanese Patent Application Nos. 2000-118620 filed Apr. 19, 2000, the contents of which are also incorporated hereinto by reference in their entirety.

BACKGROUND OF THE INVENTION

1. The Field of the Invention

The present invention relates to a data conversion apparatus, a signal, a data conversion method, a DCE (Data Circuit-terminating Equipment), a gateway and a communication apparatus. More specifically, the present invention relates to a data conversion apparatus etc. for inhibiting octet/bit insertion in a section which does not require octet insertion or bit insertion (hereinafter referred to "octet/bit insertion") during communication on the basis of PPP (Point-to-Point Protocol). The present invention further relates to a communication apparatus which reduces control packet on the communication line.

2. The Relevant Technology

PPP is present as a data link layer protocol of OSI reference model. PPP is a bit/byte synchronous and an asynchronous link control protocol by a serial circuit. PPP is specified in RFC (Request For Comments) 1661 and RFC 1662 of IETF (Internet Engineering Task Force).

FIG. 1 is a diagram showing a PPP frame configuration (frame format). The PPP frame has a flag field, address field, control field, protocol field, information field and FCS field. The number of bytes of respective fields are 1 byte for the flag field, 1 byte for the address field, 1 byte for the control field, 1 or 2 bytes for the protocol field, and 2 or 4 bytes for the FCS field. The address field and the control field may sometimes be compressed by negotiation of LCP (Link Control Protocol) ACFC (Address and Control Field Compression). Further, the protocol field may sometimes be compressed by LCPPFC (Protocol Field Compression) negotiation. Still further, the FCS (Frame Check Sequence) field may sometimes be compressed by LCPFCS negotiation.

FIG. 2 is a diagram showing an example of communication between DTE (Data Terminal Equipment) through a communication network and PSTN (Public Switched Telephone Network). In FIG. 2, an exchange 8 and a gateway 10 form a communication network 5. DTE 2 and DTE 14 perform communication through DCE 4, exchange 8, gateway 10 and PSTN 12. The communication network 5 can be, for example, a mobile communication network, and DCE 4 can be, for example, a mobile station.

In this case, it is considered that data communication between DTE 2 and DTE 14 is performed on the basis of PPP. Heretofore, when a data signal is transmitted from DTE 2 to DTE 14, the data signal has been transmitted after making octet/bit insertion in DTE 2. Further, in DTE 14, octet deletion or bit deletion (hereinafter referred to "octet/bit deletion") has been performed to the received data signal. On the other hand, when a data signal is transmitted from DTE 14 to DTE 2, octet/bit insertion has been performed in DTE 14, and octet/bit deletion in DTE 2.

Further, it is also considered that only data communication between DTE 2 and a given point (point for terminating PPP) in the network is performed on the basis of PPP. As the given point in the network, for example, the exchange 8, the gateway 10 or the like is considered. Here, description is made for a case where the gateway 10 is the terminating point. In the past, when a data signal is transmitted from DTE 2 to DTE 14, octet/bit insertion has been made in DTE 2, octet/bit deletion made on the received data signal in gateway 10, and then the data signal has been transmitted to DTE 14. On the other hand, when transmitting a data signal from DTE 14 to DTE 2, octet/bit insertion has been made in gateway 10, and octet/bit deletion has been made in DTE 2.

However, in data communication based on the prior art PPP, even in a section not requiring octet/bit insertion, a data signal is transmitted and received in the octet/bit inserted state. For example, it is considered that octet/bit insertion is unnecessary in the section between DCE 4 and gateway 10 in FIG. 2, however, in the prior art, octet/bit insertion has been made even in this section. When octet/bit insertion is made, data transmission amount is increased, and throughput is deteriorated. Octet insertion means, for example, a specific 1-byte data is escape processed with a 1-byte escape character (1 byte) to form a 2-byte data (will be described later in detail with reference to FIG. 9). Further, bit insertion is described using an example, when a flag ("01111110" in binary notation) is to be distinguished from other data portion, bit insertion is made, to data other than the flag, when five "1s II continue, "0" is inserted after the data.

Incidentally, as a DTE data link layer protocol used for the purpose of connecting to internet/intranet through public communication network or private communication network, PPP (Point-to-Point Protocol) is frequently used.

PPP enables transfer of various network protocols such as IP (Internet Protocol), Appletalk, and the like. The PPP specifications are specified as RFC (Request For Comment) of IETF (Internet Engineering Task Force).

FIG. 17 is a diagram showing a communication example. In the example of FIG. 17, a DTE (Data Terminal Equipment) 52 and a DTE 60 perform communication through a DCE (Data Circuit-terminating Equipment) 54, a network 56 and a DCE 58. Here, the DCE 54 and the DCE 58 can be, for example, mobile stations (portable telephones).

FIG. 18 shows a PPP frame format. Flag represents start or end of PPP, and is used for identifying a frame partition. Address field is information representing address of this PPP frame, for which a fixed value is generally used. Control field is information used for identifying frame type, for which a fixed value is generally used. Protocol field is used for identifying the protocol of packet included in the information field, and protocol packet shown in the protocol field is included in the information field. FCS (Frame Check Sequence) is used for making error detection from the address field to the information field.

FIG. 19 shows a PPP procedure. PPP transfers to a link establish phase when a physical layer starts in a link stop phase. In the link establish phase, link setting procedure of LCP (Link Control Protocol) is carried out, after LCP link establishment, transfers to a verification phase, where a verification procedure is carried out as necessary. When verification is successful, PPP transfers to a network layer protocol phase, where NCP link setting procedure corresponding to each network protocol is performed. When each NCP link is established, packet of network protocol corresponding to each NCP becomes transferable. Further, PPP transfers to a link end phase by a communication end request or the like. LCP instructs to transmit an end request packet, when its identification packet is received, so that PPP link is closed and the physical layer is cut off. Further, close of the PPP link is notified to the network layer. When the physical layer is cut off, PPP returns to the link stop phase.

An LCP or NCP link establish sequence example is shown in FIG. 20. Here, link: establish condition is that node A and node B transmit and receive respective setting identification packets. In respective packets, ID is used for correspondence of setting request packet with response packet (setting identification packet, setting negation packet, or setting rejection packet), and ID value received in the request packet is included in the ID value of the response packet. When transmitting a setting request packet, an option (Opt_A~G) can be designated.

Reception side of the setting request packet, when all options included in the setting request packet can be recognized, and those values are all tolerable, accepts all options included in the setting request packet in the setting identification packet and performs a response.

The setting request packet reception side, when an unrecognizable option is present in options included in the setting request packet, in the setting rejection packet makes a response including the unrecognizable option.

The setting request packet reception side, when all options included in the setting request packet are recognizable, however, intolerable option values exist, in the setting negation packet includes only intolerable value option, however, changes these options to tolerable values and performs a response. Further, when options other than those included in the setting request packet are to be requested to the setting request packet transmission side, those options can also be added to the packet.

The setting request packet transmission side, when receiving a setting rejection packet, such rejected options are removed, and then transmits the setting request packet again.

The setting request packet transmission side, when receiving a setting negation packet, a setting request packet with option values changed to those included in the setting negation packet. However, when a plurality of values exist in the options of the setting negation packet, one of them is selected.

A negotiation procedure example up to LCP or NCP link establishment will be described with reference to FIG. 20.

(a) Setting request (configure request) packet was transmitted from node A to node B, however, lost halfway in the transmission.

(b) Node A, because a response packet to setting request packet of (a) is not received for a certain period of time, transmitted the setting request packet again. At this moment, only ID value was set to a value different from the setting request packet of (a).

(c) Setting request packet was transmitted from node B to node A, however, lost halfway in the transmission.

(d) Node B, because options Opt_C, Opt_D, and Opt_E in the setting request packet of (b) cannot be recognized, made a response including these options in the setting rejection (configure reject) packet.

(e) Node A, removed options Opt_C, Opt_D, and Opt_E in the received setting rejection packet of (d), changed the ID value, and then transmitted setting request packet.

(f) Node B, because all options in the received setting request packet of (e) were recognizable and these values are all tolerable, in the setting identification (configure ack (acknowledge)) packet made a response including all options in the setting request packet.

(g) Node B, because a response packet to setting request packet of (c) is not received for a certain period of time, transmitted again the setting request packet of the same format as the setting request packet of (c).

(h) Node A, because option Opt_G in the setting request packet of (g) cannot be recognized, made a response including this option in the setting rejection packet. (i) Node B, removed the option Opt_G in the received setting rejection packet of (h), changed the 1D value and transmitted the setting request packet.

(j) Node A, because value w2 of the option Opt_A in the setting request packet of (i) is tolerable, however, value z1 of the option Opt_F is intolerable, and it is tolerable if the value is z2, in the setting negation (configure nak (negative acknowledg.e)) packet changed the value of option $Opt_1$ F to z2 and transmitted it.

(k) Node B, changed option Opt_F in the received setting negation packet of (j) and transmitted the setting request packet.

(l) Node A, because all options in the received setting request packet of (k) can be recognized and these values are all tolerable, in the setting identification packet made a response including all options in the setting request packet.

An example of LCP link cut sequence is shown in FIG. 21.

(a) Node A transmitted end request (terminate request) packet to require link release.

(b) On receiving the end request packet, node B transmitted the end identification (terminate ack) packet. Node A receiving the end identification packet became a link close state.

(c) Node B, after waiting for a certain time from the end identification packet transmission, transmitted an end request packet.

(d) Node A, on receiving the end request packet, transmitted the end identification packet, cut off the physical layer, and transferred to the link stop phase. The node B receiving the end identification packet became a link close state, cut off the physical layer, and transferred to the link stop phase.

FIG. 22 shows a keep alive sequence example using LCP echo request/response packet.

The LCP echo request/response packet is used during LCP link establishment and can be used for determining whether or not the link is held.

(a) Node A transmitted LCP echo request packet to confirm whether or not LCP link is maintained.

(b) Node B on receiving the LCP echo request packet, transmitted LCP echo response (echo reply) packet to respond that the link is maintained.

(c) Node B transmitted LCP echo request packet to confirm whether or not LCP link is maintained.

(d) Node A on receiving the LCP echo request packet transmitted LCP echo response packet to respond that the link is maintained.

As one of characteristics of packet communication, since the communication line is used only when data is generated, a communication node exists in which adoption of a communication fee system based on the data amount is possible. As a requirement in such a communication node, it is desirable that communication fee is not required when user data to be communicated does not exist, that is, actually the communication line is not used.

In the past, when PPP is used as DTE data link layer protocol in a communication node adopting a communication tariff system based on the data amount, by transferring PPP control packets at the communication start time and communication end time, LCP echo request/response packet for making continuity confirmation of PPP link periodically, and the like, there are problems that an extra communication tariff is required from the user point of view, and communication cost and communication traffic amount tend to increase from the communication enterprise point of view.

BRIEF SUMMARY OF THE INVENTION

In a first aspect of the present invention, there is provided a communication method in a third communication apparatus which is directly connected to a first communication apparatus and can communicate with a second communication apparatus through a network, the first communication apparatus and the second communication apparatus performing data communication based on PPP, the communication method comprising the steps of:

receiving an LCP echo request transmitted by the first communication apparatus to the second communication apparatus; and transmitting an LCP echo reply to the first communication apparatus.

Here, the third communication apparatus may be a DCE, and the network may include a mobile communication network.

In a second aspect of the present invention, there is provided a communication method in a third communication apparatus of a first node located between a first communication apparatus of the first node and a second communication apparatus of a second node, the first communication apparatus and the second communication apparatus performing data communication based on PPP, the communication method comprising the steps of:

intermediating a setting request packet from the second communication apparatus to the first communication apparatus;

receiving a setting rejection packet or a setting negation packet from the first communication apparatus;

producing a setting request packet according to the setting rejection packet or the setting negation packet; and transmitting the produced setting request packet to the first communication apparatus.

Here, the third communication apparatus may notify setting rejection or setting negation to the second communication apparatus by transmitting only information included in a setting rejection packet or a setting negation packet to the second communication apparatus, when the third communication apparatus receives the setting rejection packet or the setting negation packet from the first communication apparatus, after intermediating a setting request packet from the second communication apparatus to the first communication apparatus.

Here the third communication apparatus may terminate a setting identification packet when the third communication apparatus receives the setting identification packet after intermediating a setting request packet from the second communication apparatus to the first communication apparatus and receiving a setting rejection packet or a setting negation packet from the first communication apparatus, and the third communication apparatus may not terminate a setting identification packet when the third communication apparatus receives the setting identification packet without receiving a setting rejection packet or a setting negation packet from the first communication apparatus after intermediating a setting request packet from the second communication apparatus to the first communication apparatus.

Here, the third communication apparatus may be a mobile station

In a third aspect of the present invention, there is provided a communication method in a third communication apparatus of a first node located between a first communication apparatus of the first node and a second communication apparatus of a second node, the first communication apparatus and the second communication apparatus performing data communication based on PPP, the communication method comprising the steps of:

intermediating a setting request packet from the first communication apparatus to the second communication apparatus;

intermediating a notification of setting rejection or setting negation from the second communication apparatus to the first communication apparatus;

receiving a setting request packet from the first communication apparatus; and terminating the received setting request packet.

Here, the third communication apparatus may produce a setting rejection packet or a setting negation packet and transmit it to the first communication apparatus, when the third communication apparatus receives a notification of setting rejection or setting negation from the second communication apparatus after intermediating a setting request packet from the first communication apparatus to the second communication apparatus.

Here, the third communication apparatus may produce a setting identification packet and transmit it to the first communication apparatus, when the third communication apparatus receives from the first communication apparatus, all of setting request packets according to notifications of setting rejection or setting negation from the second communication apparatus to the first communication apparatus after intermediating setting request packets from the first communication apparatus to the second communication apparatus and intermediating the notifications.

Here, the third communication apparatus may be a mobile station.

In a fourth aspect of the present invention, there is provided a communication method in a third communication apparatus of a first node located between a first communication apparatus of the first node and a second communication apparatus of a second node, the first communication apparatus and the second communication apparatus performing data communication based on PPP, the communication method comprising the steps of:

intermediating a notification of end request from the first communication apparatus to the second communication apparatus;

producing an end identification packet; and transmitting the produced end identification packet to the first communication apparatus.

Here, the third communication apparatus may produce an end request signal and transmit it to the second communication apparatus, when the third communication apparatus receives an end request packet from the first communication apparatus.

Here, the third communication apparatus may produce an end request packet and transmit it to the first communication apparatus, when the third communication apparatus receives a notification of an end identification from the second communication apparatus after intermediating a notification of an end request from the first communication apparatus to the second communication apparatus.

Here, the third communication apparatus may terminate an end identification packet, when the third communication apparatus receives the end identification packet from the first communication apparatus after transmitting the produced end request packet.

Here, the third communication apparatus may be a mobile station.

In a fifth aspect of the present invention, there is provided a communication method in a third communication apparatus of a first node located between a first communication apparatus of the first node and a second communication apparatus of a second node, the first communication apparatus and the second communication apparatus performing data communication based on PPP, the communication method comprising the steps of:

intermediating a notification of end request from the second communication apparatus to the first communication apparatus;

receiving an end identification packet from the first communication apparatus; and terminating the end identification packet, wherein the third communication apparatus produces an end identification signal and transmits it to the second communication apparatus, when the third communication apparatus receives an end request packet from the first communication apparatus after intermediating a notification of an end request from the second communication apparatus to the first communication apparatus.

Here, the third communication apparatus may produce an end identification packet and transmit it to the first communication apparatus after transmitting the produced end identification signal.

Here, the third communication apparatus may be a mobile station.

In a sixth aspect of the present invention, there is provided a communication method in a third communication apparatus which can communicate with a first communication apparatus through a first network and can communicate with a second communication apparatus through a second network, the first communication apparatus and the second communication apparatus performing data communication based on PPP, the communication method comprising the steps of:

receiving an LCP echo request transmitted by the first communication apparatus to the second communication apparatus; and transmitting an LCP echo reply to the first communication apparatus, wherein the first network is a telephone network.

Here, the third communication apparatus may be a gateway, and the second network may include a mobile communication network.

In a seventh aspect of the present invention, there is provided a communication method in a third communication apparatus which is directly connected to a first communication apparatus and can communicate with a second communication apparatus through a network, the first communication apparatus and the second communication apparatus performing data communication based on PPP, the communication method comprising the steps of:

receiving an LCP discard request transmitted by the first communication apparatus to the second communication apparatus; and discarding the LCP discard request.

Here, the third communication apparatus may be a DCE, and the network may include a mobile communication network.

In an eighth aspect of the present invention, there is provided a communication method in a third communication apparatus which can communicate with a first communication apparatus through a first network and can communicate with a second communication apparatus through a second network, the first communication apparatus and the second communication apparatus performing data communication based on PPP, the communication method comprising the steps of:

receiving an LCP discard request transmitted by the first communication apparatus to the second communication apparatus; and discarding the LCP discard request, wherein the first network is a telephone network.

Here, the third communication apparatus may be a gateway, and the second network may include a mobile communication network.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a diagram showing PPP frame construction;

FIG. 3 is a diagram showing an example of improved frame construction according to a first embodiment of the present invention;

DETAILED DESCRIPTION OF THE PREFERRED EMBODIMENTS

In the following, embodiments of the present invention will be described in detail with reference to the drawings.

Figure 2:
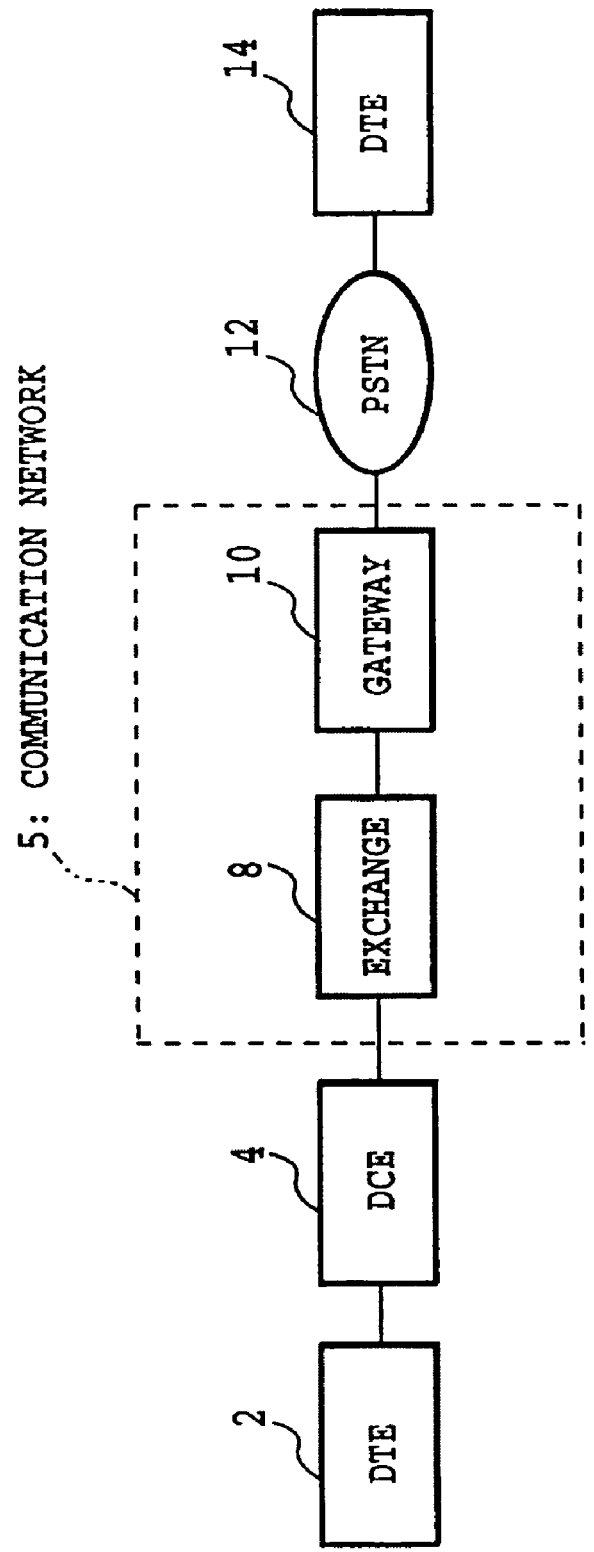
FIG. 2 is a diagram showing an example of communication between DTEs through a communication network and PSTN.

In the first and second embodiments, an example of communication between DTEs through the communication network and PSTN shown in FIG. 2 will be described.

First Embodiment

In the first embodiment of the present invention, data communication between DTE 2 and DTE 14 is performed on the basis of PPP.

FIG. 3 is a diagram showing an example of improved PPP frame construction according to the present embodiment. The improved PPP frame has an additional information field, an address field, a control field, a protocol field, an information field and a FCS field. That is, the frame has a frame construction in which additional information is added to a frame construction with the flag deleted from the PPP frame construction. The additional information includes identification information for identifying frame partition. In the present embodiment, frame length (number of bytes of the frame) is used as the identification information.

Further, a frame construction with a flag added to the frame construction of FIG. 3 can also be used. That is, it is also possible that, without deleting the flag from the PPP frame construction, but the additional information is simply added.

Figure 4:
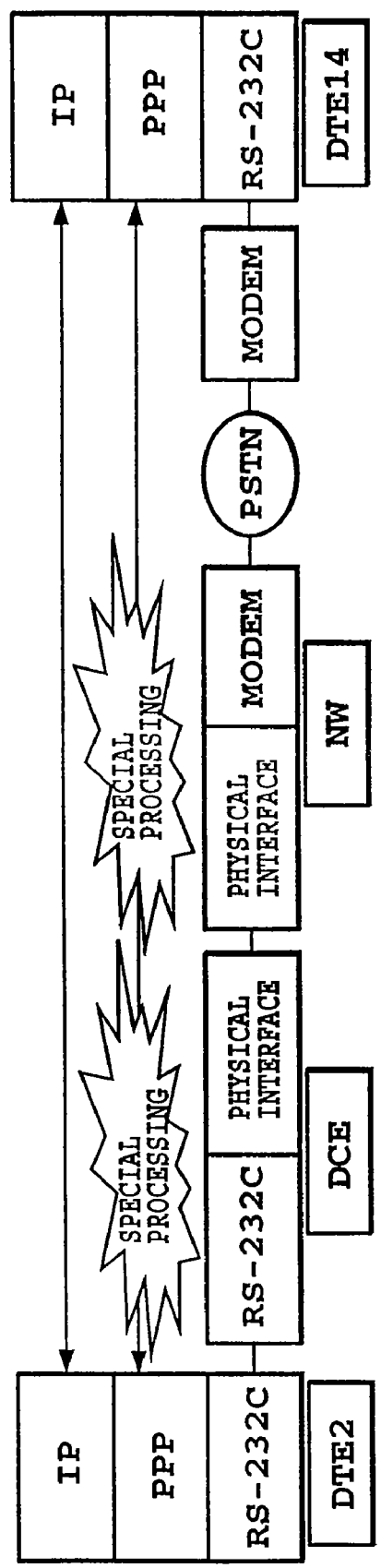
FIG. 4 is a diagram for explaining data communication between DTE 2 and DTE 14.

FIG. 4 is a diagram for explaining data communication between DTE 2 and DTE 14. When transmitting a data signal from DTE 2 to DTE 14, octet insertion is performed in DTE 2 to the data as in the prior art, and then the result is transmitted. In DCE 4, a special processing (this processing will be described below) is performed, in which the data having the PPP frame construction and octet inserted is converted to data which has an improved frame construction (FIG. 3) and is not octet inserted. In the gateway 10 (indicated by NW in FIG. 4), a special processing is performed, whereby the data having the improved PPP frame construction and not octet inserted is converted to data which has the PPP frame construction and is octet inserted. After the data conversion, the gateway 10 transmits the signal including the converted data to DTE 14. Then, in DTE 14, octet deletion is performed as in the prior art.

On the other hand, when transmitting a data signal from DTE 14 to DTE 2, octet insertion is performed in DTE 14 to the data as in the prior art, and the data transmitted. In the gateway 10, a special processing is performed, in which the data having the PPP frame construction and octet inserted is converted to data which has an improved frame construction and is not octet inserted. In DCE 4, a special processing is performed, whereby the data having the improved PPP frame construction and not octet inserted is converted to data which has the PPP frame construction and is octet inserted. Then, in DTE 2, octet deletion is performed as in the prior art.

As described above, between DCE 4 and gateway 10, a signal including data having the improved PPP frame construction shown in FIG. 3 and not octet inserted is transmitted. With this method, data transmission amount is reduced and the throughput improved.

In DCE 4 and gateway 10, to perform the above special processing, a first data conversion apparatus 20 and a second data conversion apparatus 30.

Figure 5:
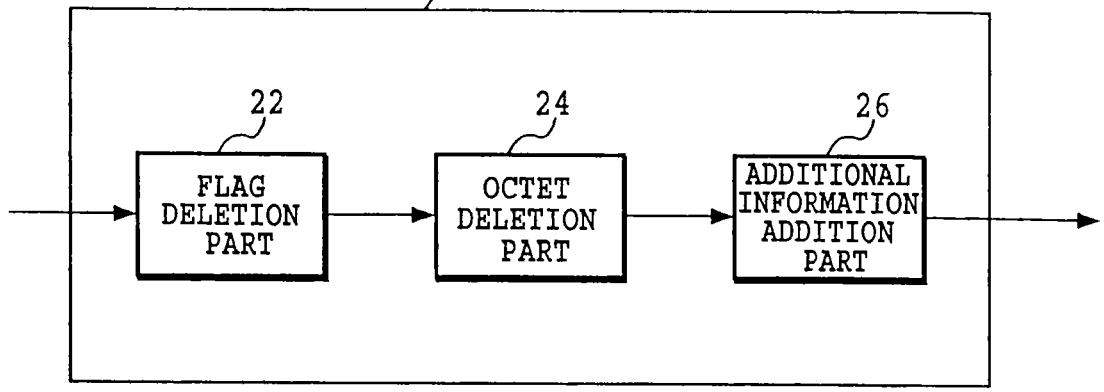
FIG. 5 is a diagram showing construction example of a first data conversion apparatus.

FIG. 5 is a diagram showing construction example of the first data conversion apparatus. The first data conversion apparatus 20 comprises a flag deletion part 22, an octet deletion part 24 and an additional information addition part 26. When using a frame construction in which between DCE 4 and gateway 10, a flag is added (remained) to the frame construction of FIG. 3, the flag deletion part 22 is unnecessary.

Figure 6:
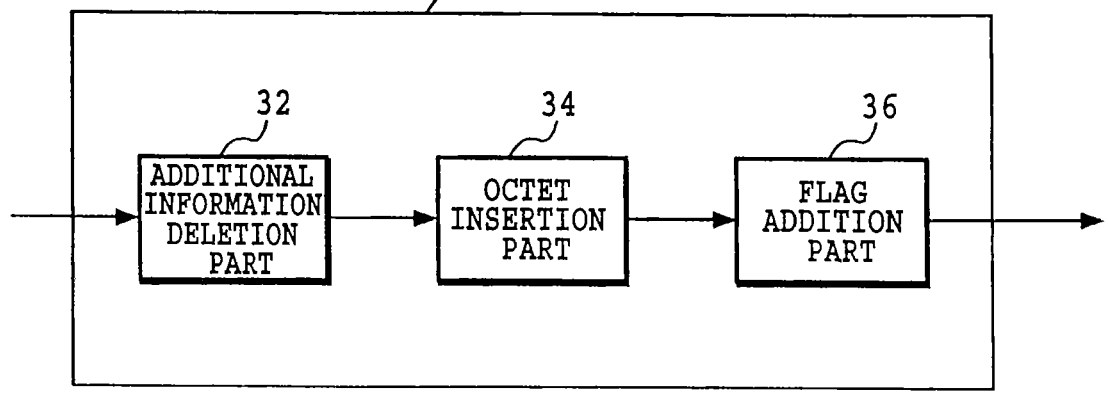
FIG. 6 is a diagram showing construction example of a second data conversion apparatus.

FIG. 6 is a diagram showing a construction example of the second data conversion apparatus. The second data conversion apparatus 30 comprises an additional information deletion part 32, an octet insertion part 34 and a flag addition part 36. When using a frame construction in which a flag is added between DCE 4 and gateway 10 of the frame construction of FIG. 3, the flag addition part 36 is unnecessary.

Figure 7:
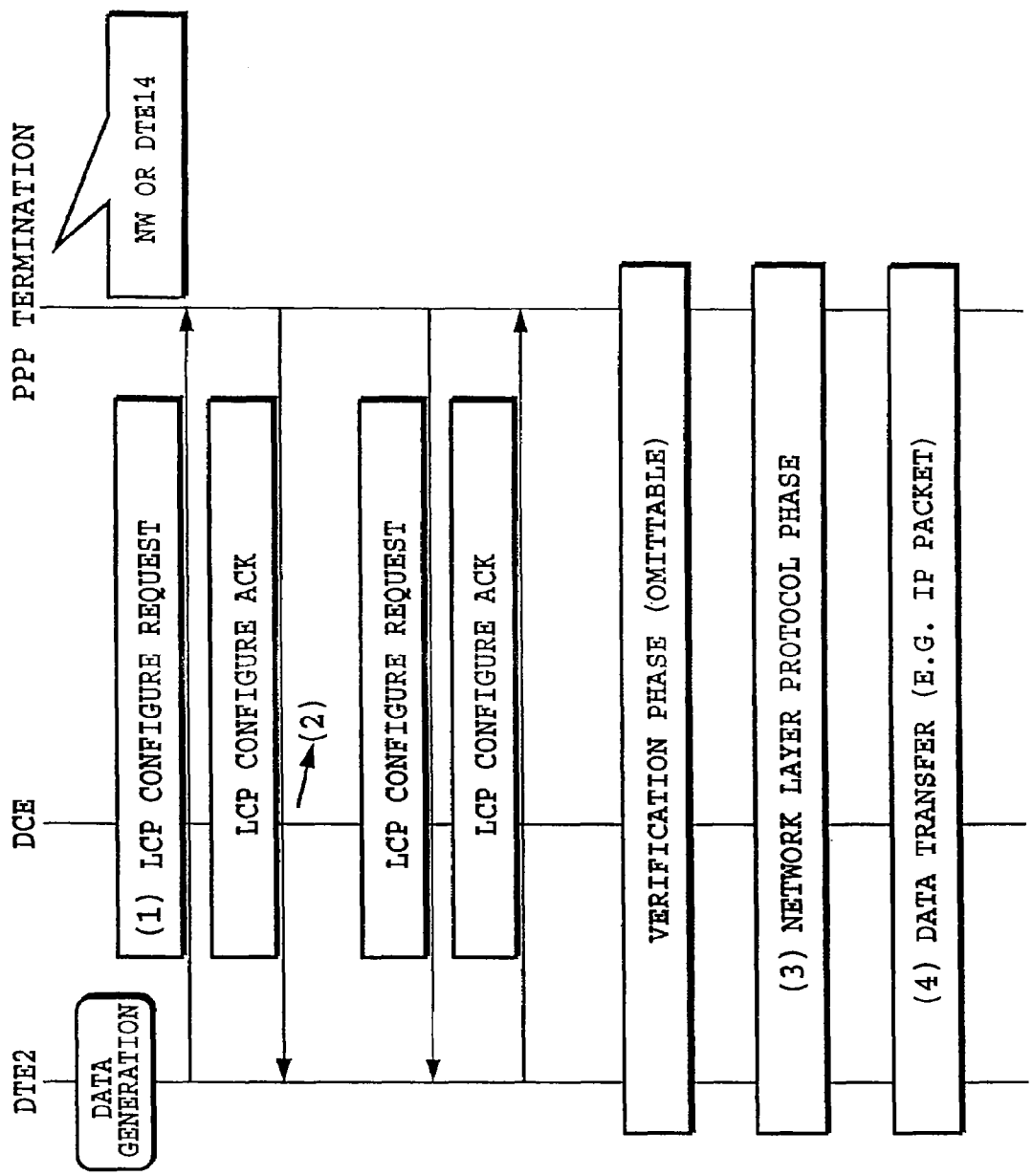
FIG. 7 is a diagram showing a negotiation processing example when data is generated in DTE 2.

FIG. 7 is a diagram showing a negotiation processing example when data is generated in DTE 2. DTE 2, when data is generated, to establish PPP link, transmits LCP link setting request to PPP termination (DTE 14) ((1) of FIG. 7). PPP termination is DTE 14, however, it can be gateway 10 or the like. A case where the PPP termination is gateway 10 will be described in a second embodiment of the present invention. DCE 4 monitors response of LCP and, when ACCM (Async Control Character Map) is included in the response from the DTE 14 side, stores it, receives PPP frame from the DTE 14 side, and utilizes it for octet insertion processing when transmitting to the DTE 2 side (FIG. 7(2)). In the network layer protocol phase after the verification phase (this can be omitted), negotiation of what is used for the network layer protocol (for example, IP (Internet Protocol) is performed in NCP (Network Control Protocol (FIG. 7(3)). As a result, network layer packet becomes usable. In the present embodiment, IP is used as network layer protocol, however, another protocol may be used. After that, data transfer is performed using IP packet (FIG. 7(4)). Negotiation processing when data is generated in DTE 14 can be performed by the above-described same negotiation processing as well.

Figure 8:
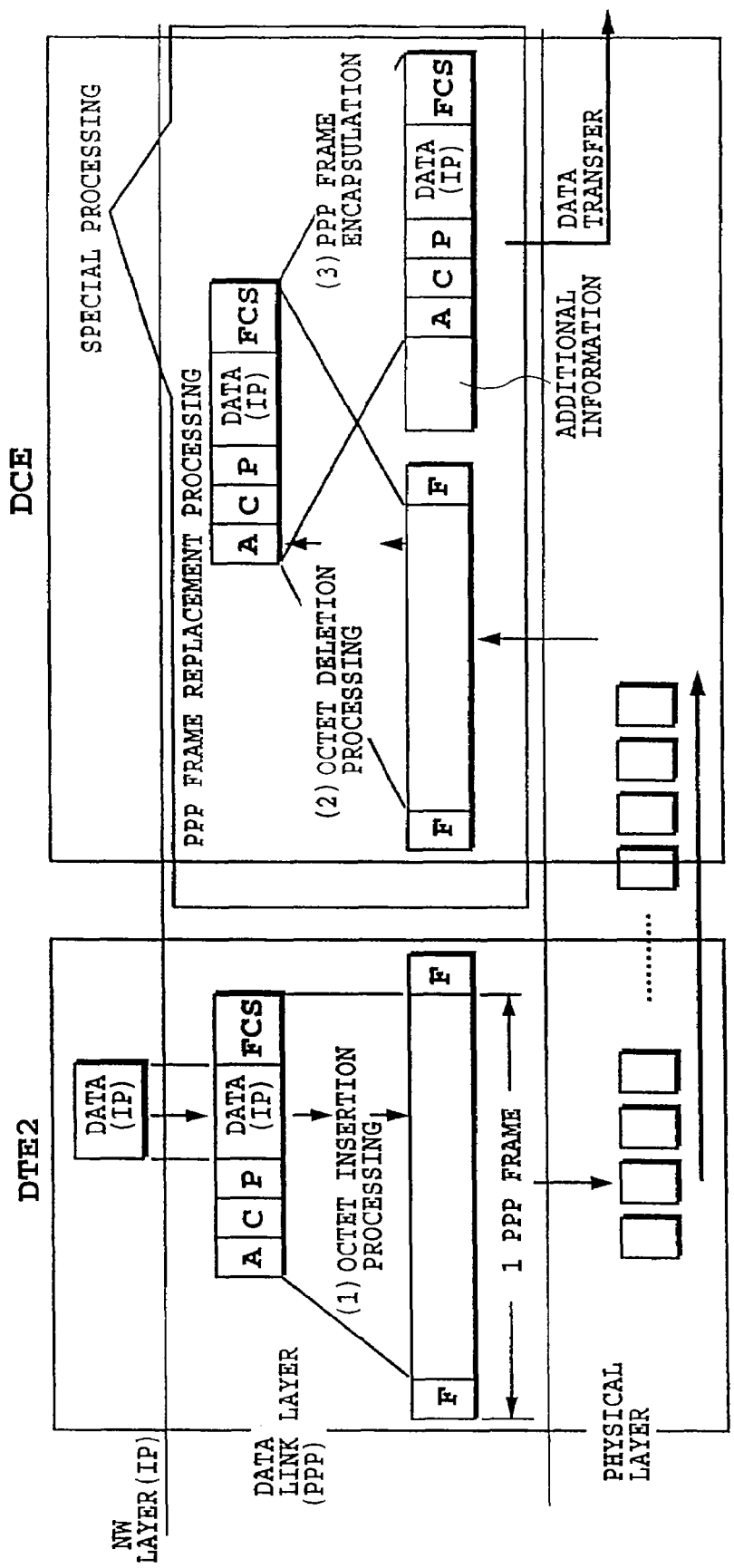
FIG. 8 is a diagram showing a processing example of DTE 2 and DCE 4 when transferring data from DTE 2 to DTE 14.

FIG. 8 is a diagram showing a processing example of DTE 2 and DCE 4 when transferring data from DTE 2 to DTE 14. In DTE 2, data received from the network layer (NW layer) is provided with an address (A), control (C), protocol (F) and FCS fields, octet insertion processing is performed according to LCP negotiation (FIG. 8 (1)), and, after adding flag (F) field, data transfer is performed. Here, since, in the octet insertion, a processing of increasing 1 byte to 2 bytes is performed, the data after octet insertion is greater than the original data. Further, before completion of negotiation, default octet insertion is performed.

In DCE 4, data portion surrounded by flag of data received from DTE 2 is taken out (flag is deleted) by the flag deletion part 22. In the octet deletion part 24, octet deletion processing which is quite the reverse to the octet insertion processing performed by DTE 2 is performed to the taken-out data portion (FIG. 8(2)). In the additional information addition part 26, additional information including identification information for identifying the partition of that 1 frame (information for recognizing that 1 frame) is added (FIG. 8 (3)). In the present embodiment, only identification information is added as the additional information. Further, frame length is used as the identification information. The data provided with the additional information is transferred towards DTE 14.

When a frame construction in which a flag is added (remained) between DCE 4 and gateway 10 in the frame construction of FIG. 3, flag deletion by the flag deletion part 22 is not performed.

Figure 9:
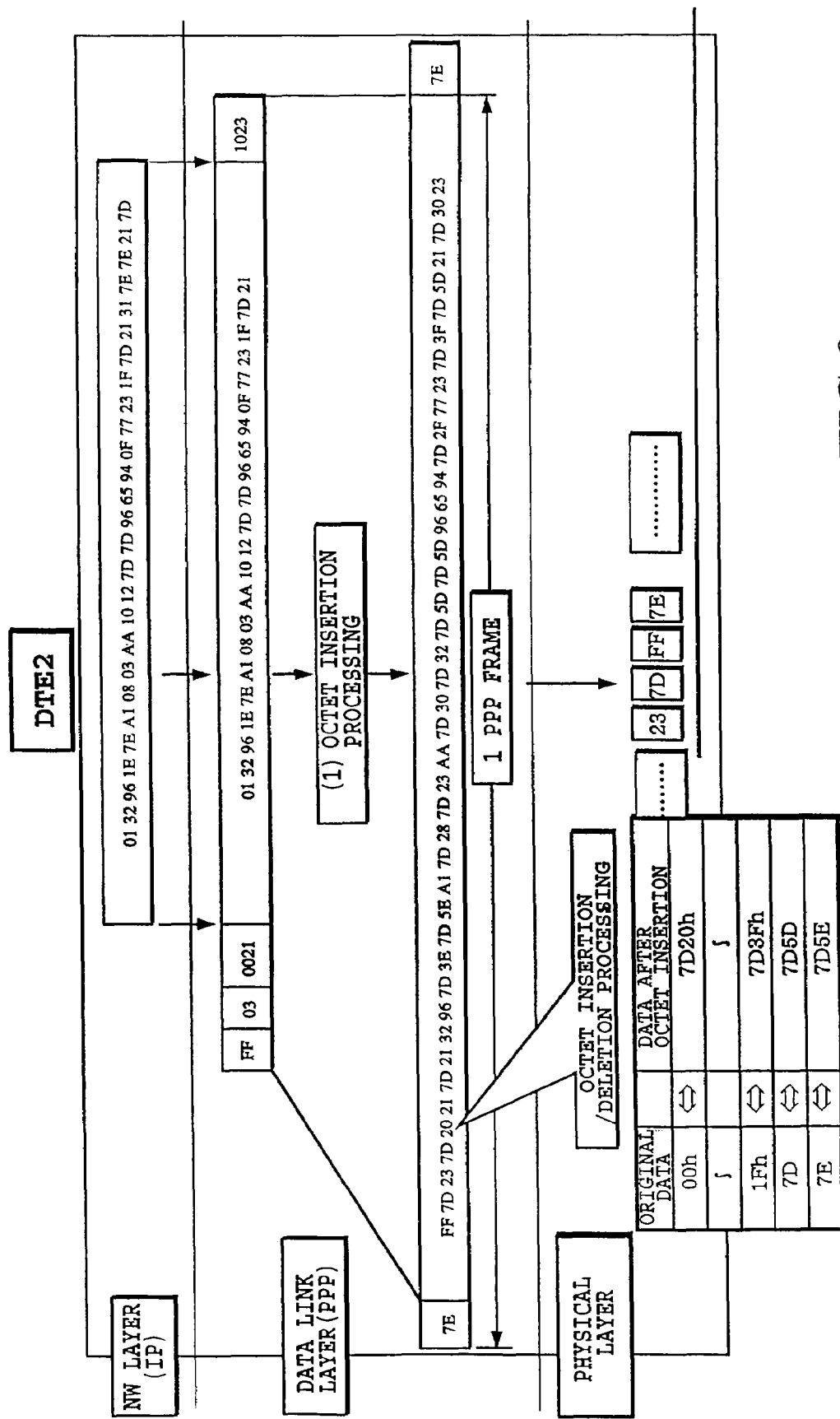
FIG. 9 is a diagram showing a practical example of octet insertion processing performed in DTE 2.

FIG. 9 is a diagram showing a practical example of octet insertion processing performed in DTE 2. In FIG. 9, octet insertion processing is shown using an example of a case where all of 00h to IFh (h indicates hexadecimal notation) are escape processed with escape character (7Dh) by LCP negotiation. In addition to 00h to 1Fh, escape processing is also performed for escape character (7Dh) and flag value (7Eh). In the present embodiment, escape processing is performed by adding escape character (7Dh) before subject data and exclusive ORing subject data with 20h. For example, when octet insertion processing is performed on data 00h, data 7D20h is formed. When performing such octet processing, the original data of 1 byte becomes a 2-byte data.

Figure 10:
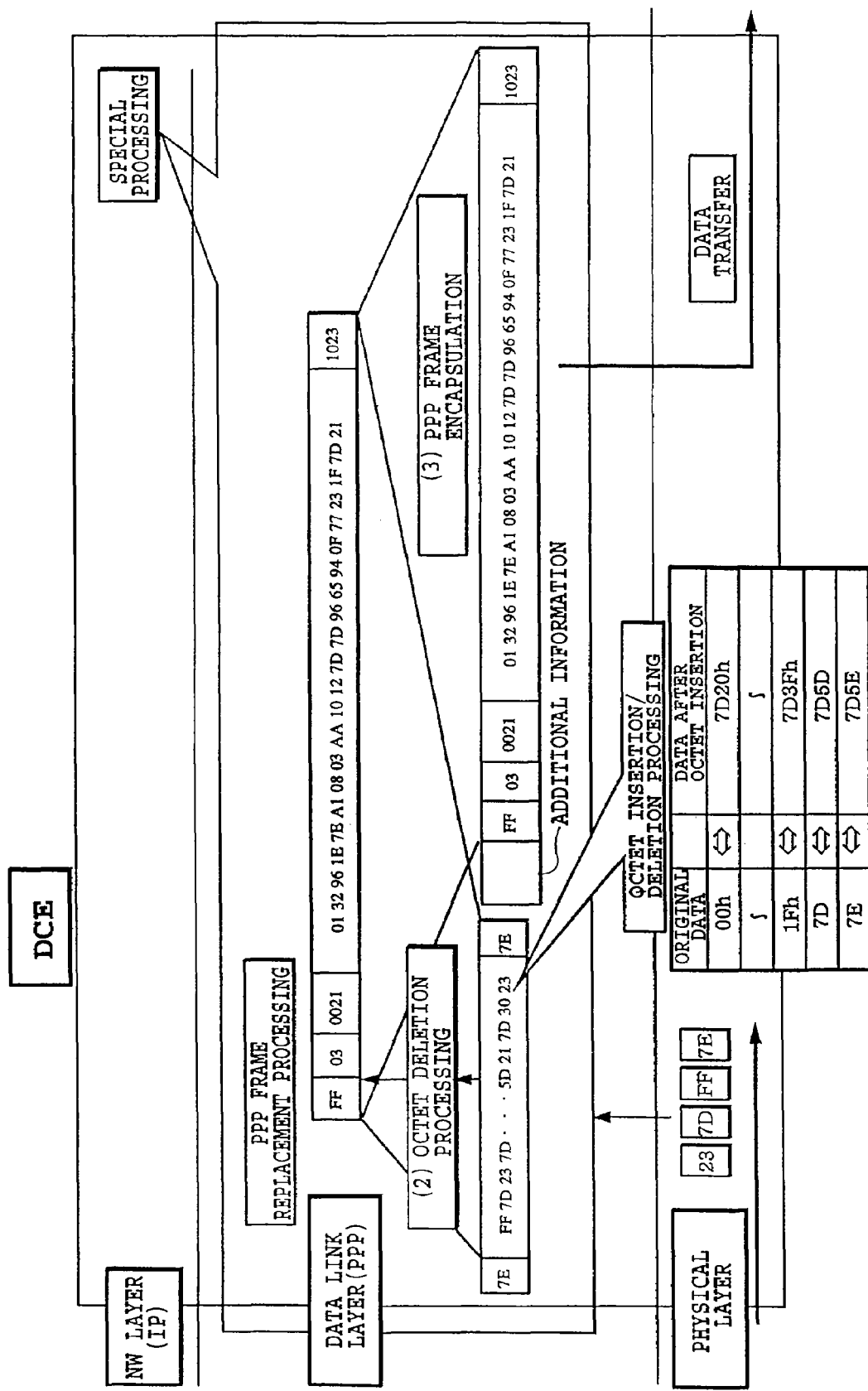
FIG. 10 is a diagram showing a practical example of octet deletion processing performed in DCE 4.

FIG. 10 is a diagram showing a practical example of octet deletion processing performed in DCE 4. In the octet deletion processing, the quite reverse processing to the octet insertion processing performed in DTE 2 is performed.

Figure 11:
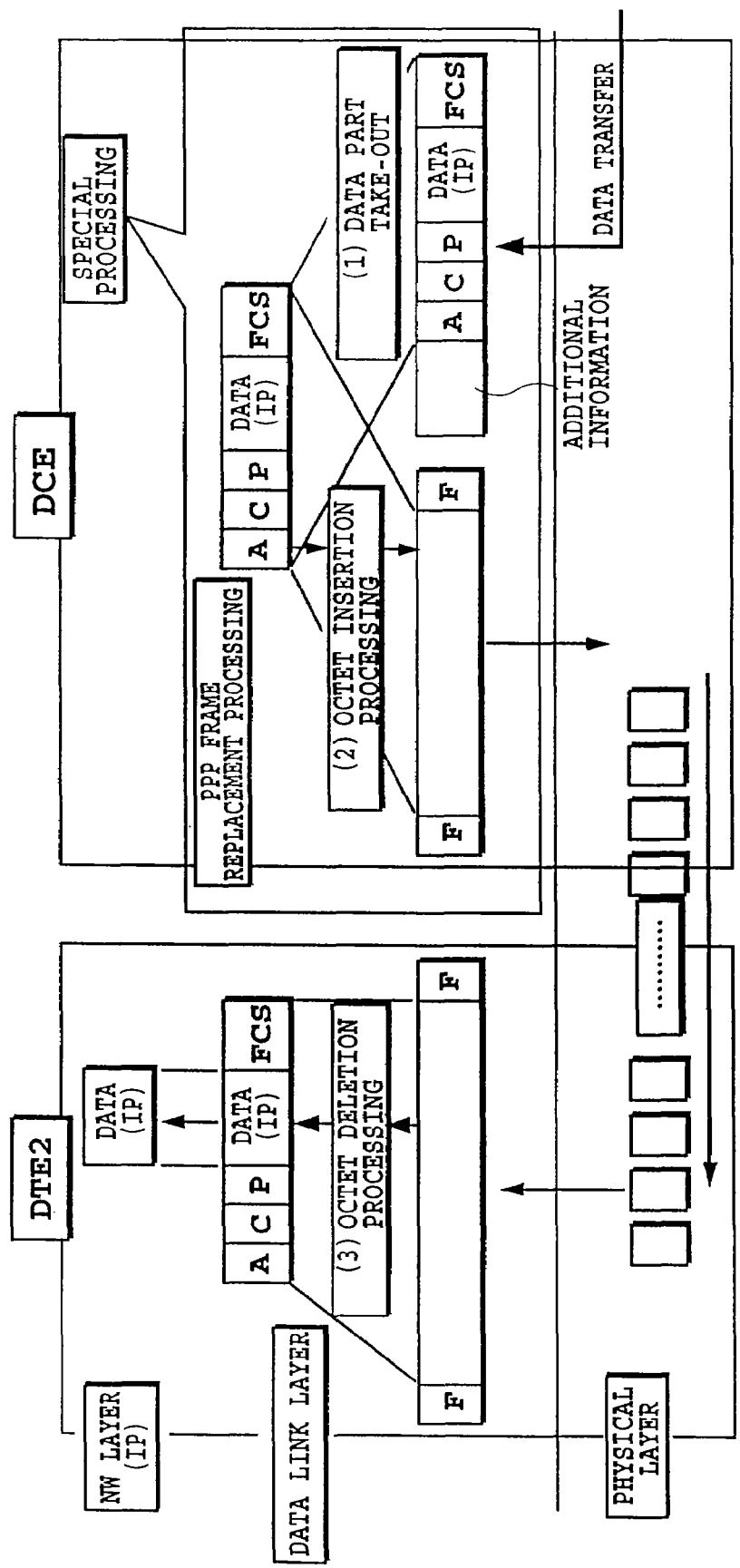
FIG. 11 is a diagram showing a processing example of DTE 2 and DCE 4 when transferring data from DTE 14 to DTE 2.

FIG. 11 is a diagram showing a processing example of DTE 2 and DCE 4 when transferring data from DTE 14 to DTE 2. In DCE 4, data portion other than additional information of the received signal is taken out (additional information is deleted) in the additional information deletion part 32 (FIG. 11(1)). To the taken-out data, in the octet insertion part 34, octet insertion is performed according to ACCM negotiation result performed in. LCP (FIG. 11(2)), and, after adding a flag in flag addition part 36, data transfer is performed. Here, since octet insertion performs a processing for changing 1 byte to 2 bytes, the data after octet insertion is greater than the original data. Further, before completion of negotiation, default octet insertion is performed.

When using a frame construction in which between DCE 4 and gateway 10, a flag is added (remained) to the frame construction of FIG. 3, the flag deletion part 36 is unnecessary.

In DTE 2, as in the past, octet deletion processing is performed according to the ACCM negotiation result performed in LCP (FIG. 11(3)).

Figure 12:
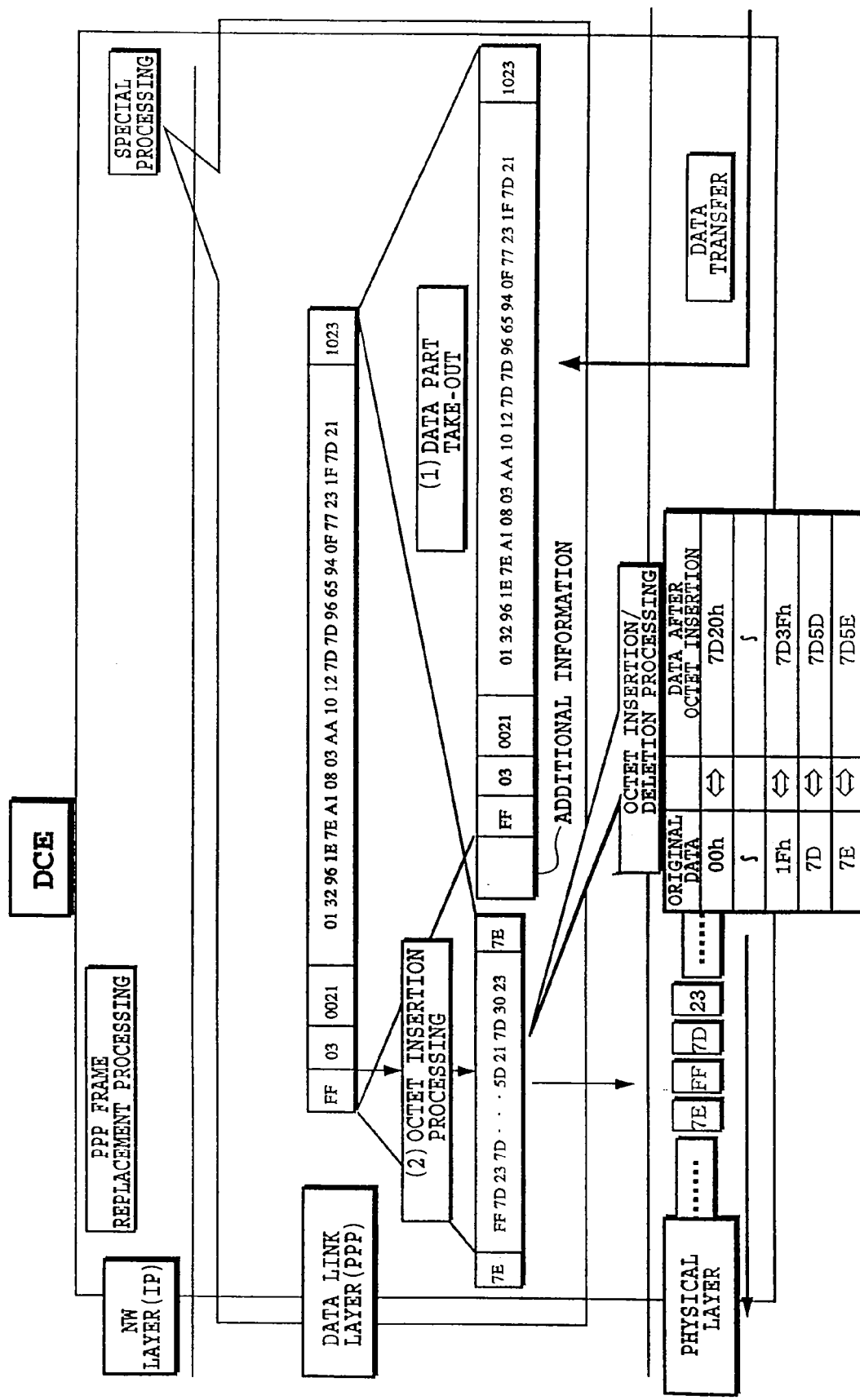
FIG. 12 is a diagram showing a practical example of octet insertion processing performed in DCE 4.

FIG. 12 is a diagram showing a practical example of octet insertion processing performed in DCE 4. The octet insertion processing performed in DCE 4 is the same as the octet insertion processing (FIG. 9) performed in DTE 2.

Figure 13:
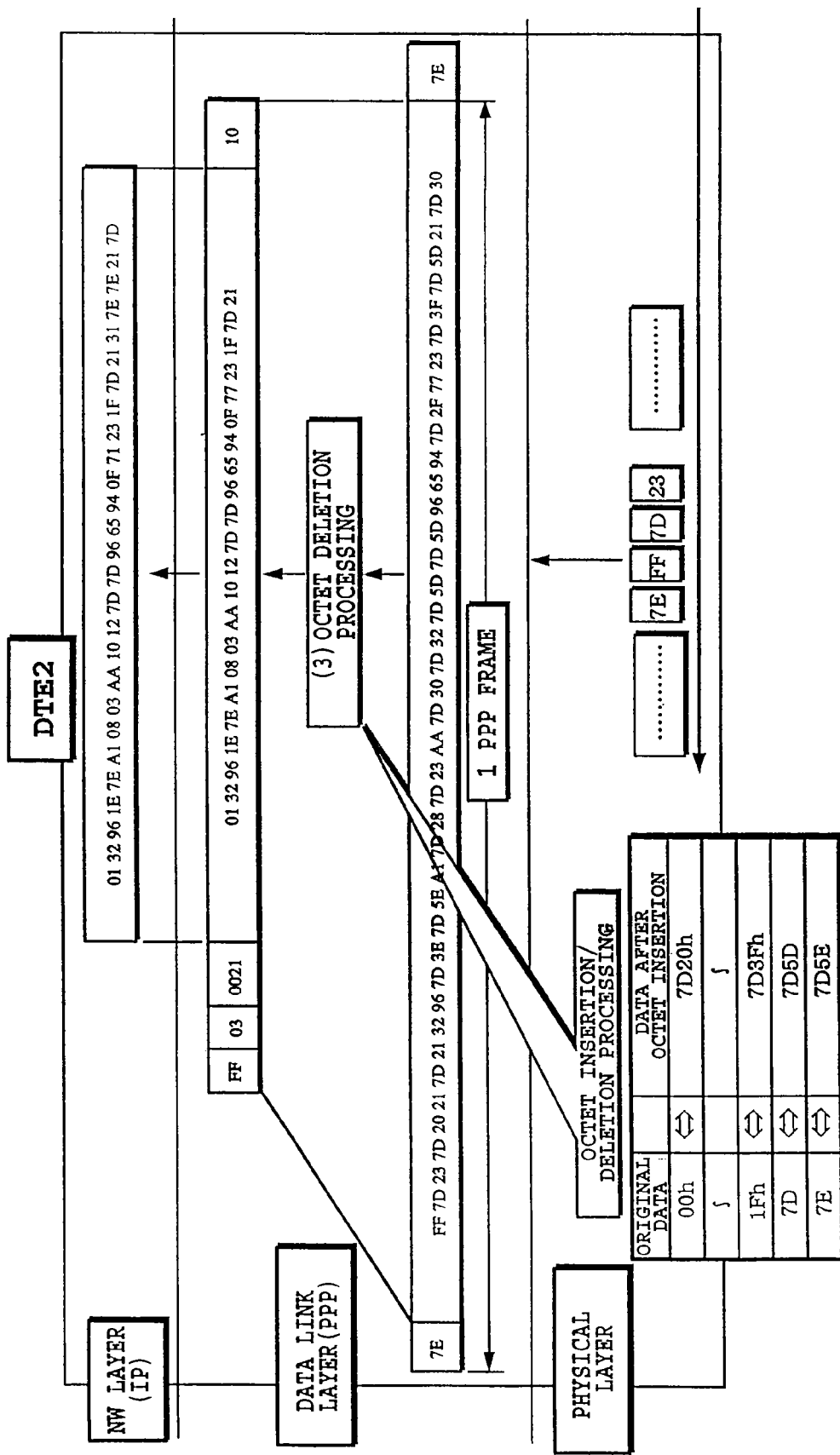
FIG. 13 is a diagram showing a practical example of octet deletion processing performed in DTE 2.

FIG. 13 is a diagram showing a practical example of octet deletion processing performed in DTE 2. In the octet deletion processing, the quite reverse processing to the octet insertion processing performed in DCE4 is performed.

The processing (octet insertion processing or the like) performed in gateway 10 when transferring data from DTE 2 to DTE 14 is the same as the processing performed in DCE 4 (FIGS. 11 and 12) when transferring data from DTE 14 to DTE 2.

Further, the processing (octet deletion processing or the like) performed in gateway 10 when transferring data from DTE 14 to DTE 2 is the same as the processing performed in DCE 4 (FIGS. 8 and 10) when transferring data from DTE 2 to DTE 14.

Figure 16:
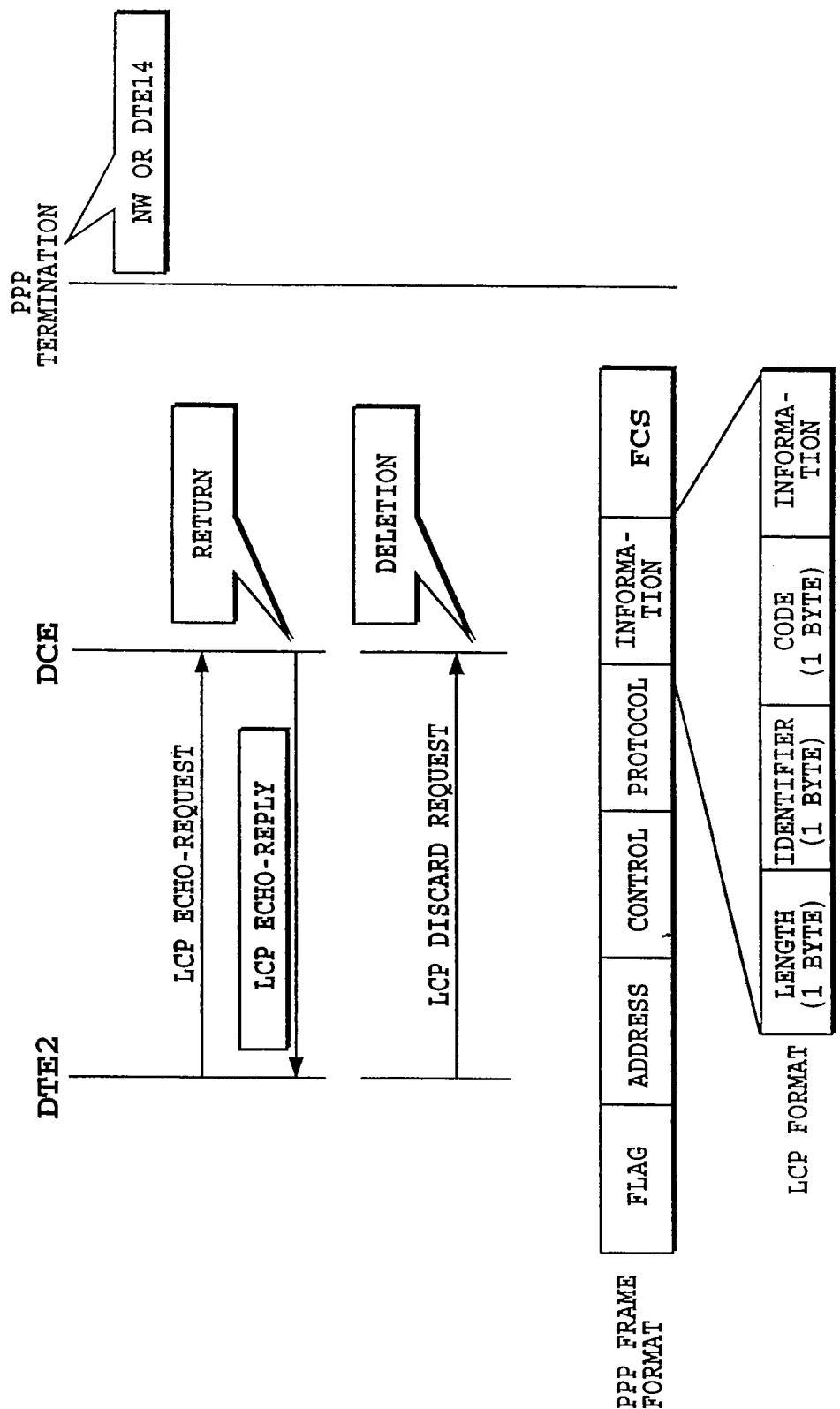
FIG. 16 is a diagram for explaining processing performed in DCE.

FIG. 16 is a diagram for explaining processing performed in DCE.

As codes in LCP format, there are LCP Echo-Request (code: 09h) and LCP Discard-Request (code: 0Bh).

In DCE 4, when one (for example, DTE 2) of two apparatus performing data communication according to PPP receives a LCP echo-request transmitted to the other (for example, DTE 14), a LCP Echo-Reply) (code: 0Ah) is transmitted to the one apparatus. This inhibits transmission of LCP echo-request to the other apparatus (transmitted in the past), thereby reducing the data transmission amount.

Further, in DCE 4, when one of two apparatus performing data transmission according to PPP receives a LCP Discard-Request transmitted to the other, the LCP Discard-Request is discarded (deleted). This inhibits transmission of LCP discard-request to the other apparatus (transmitted in the past), thereby reducing the data transmission amount.

Similarly, in gateway 10, when one (for example, DTE 14) of two apparatus performing data communication according to PPP receives a LCP echo-request transmitted to the other (for example, DTE 2), a LCP echo-reply is transmitted to the one apparatus. This inhibits transmission of LCP echo-request to the other apparatus (transmitted in the past), thereby reducing the data transmission amount.

Further, in gateway 10, when one of two apparatus performing data transmission according to PPP receives a LCP Discard-Request transmitted to the other, the LCP Discard-Request is discarded (deleted). This inhibits transmission of LCP discard-request to the other apparatus (transmitted in the past), thereby reducing the data transmission amount.

In the present embodiment, DCE 4 and gateway 10 comprise the first data conversion apparatus 20 and the second data conversion apparatus 30, however, it is also possible that, for example, only the first data conversion apparatus 20 is provided in DCE 4 and gateway 10 is provided with only the second data conversion apparatus 30, so as to use a PPP frame construction improved for use only in one-way data communication.

Still further, in the present embodiment, a special processing (octet insertion, deletion or the like) is performed in gateway 10, however, alternatively, this processing can be performed, for example, in the exchange 8.

Second Embodiment

In the second embodiment of the present invention, data communication between DTE 2 and gateway 10 is performed according to PPP.

Figure 14:
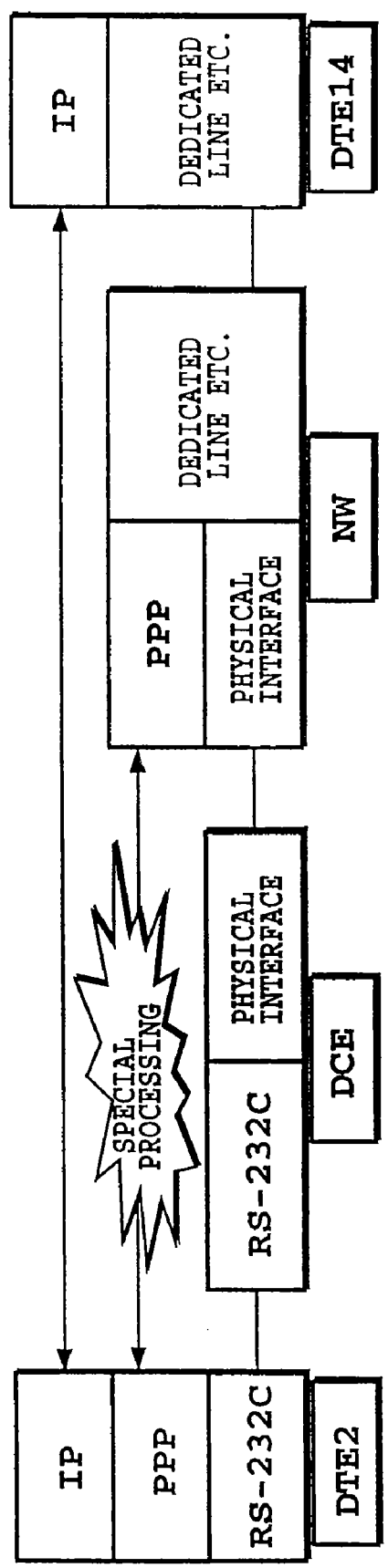
FIG. 14 is a diagram for explaining data communication between DTE 2 and gateway 10.

FIG. 14 is a diagram for explaining data communication between DTE 2 and gateway 10. The gateway 10 and DTE 14 are connected with a dedicated line. In the present embodiment, negotiation processing (FIG. 7) is performed between DTE 2 and gateway 10.

When transmitting data signal from DTE 2 to DTE 14, octet insertion is performed in DTE 2 to the data as in the past, and the result transmitted. In DCE 4, the same processing as in the first embodiment is performed, so that data having PPP frame construction and octet inserted is converted into data which has improved PPP frame construction (FIG. 3) and is not octet inserted.

Gateway 10 (indicated as NW in FIG. 14) converts data having improved PPP frame construction and not octet inserted into data which has a data link layer protocol frame construction other than PPP. The data conversion can be performed same as in the case of converting data having PPP frame construction into data having frame construction of data link layer protocol other than PPP. In the improved PPP frame construction, instead of the flag, an identification information for identifying a frame partition. After the data conversion, gateway 10 transmits a signal including the converted data to DTE 14.

On the other hand, when transmitting a data signal from DTE 14 to DTE 2, in gateway 10, the data having data link layer protocol frame construction other than PPP is converted into data having improved frame construction and not octet inserted. The data conversion can be performed same as in the case of converting data having data link layer protocol frame construction other than PPP into data having PPP frame construction. After the data conversion, gateway 10 transmits the signal including the converted data to DCE 4.

In DCE 4, the same processing as in the first embodiment is performed, so that data having improved PPP frame construction and not octet inserted is converted into data having PPP frame construction and octet inserted. After that, octet deletion is performed in DTE 2 same as in the past.

As described above, between DCE 4 and gateway 10, a signal including data having improved PPP frame construction and not octet inserted as shown in FIG. 3 is communicated. With this operation, data transmission amount is reduced and the throughput is improved.

Also in the present embodiment, as in the first embodiment, PPP frame construction improved for use in only one-way data communication can be used.

Further, in the present embodiment, a special processing (conversion to data having different frame construction) is performed in gateway 10, however, alternatively, this processing can also be performed, for example, in the exchange 8 as well.

Still further, also in the present embodiment, DCE 4 and gateway 10 perform the processing shown in FIG. 16.

[Others]

The first and second embodiments use additional information, however, if a construction is available which is capable of identifying 1 PPP in a lower layer than PPP, such additional information is unnecessary. In such a case, the additional information addition part 26 and the additional information deletion part 32 are unnecessary.

In the first and second embodiments, the present invention is described in conjunction with octet insertion and deletion, however, the present invention can also be applied to the case of bit insertion and deletion.

Figure 15:
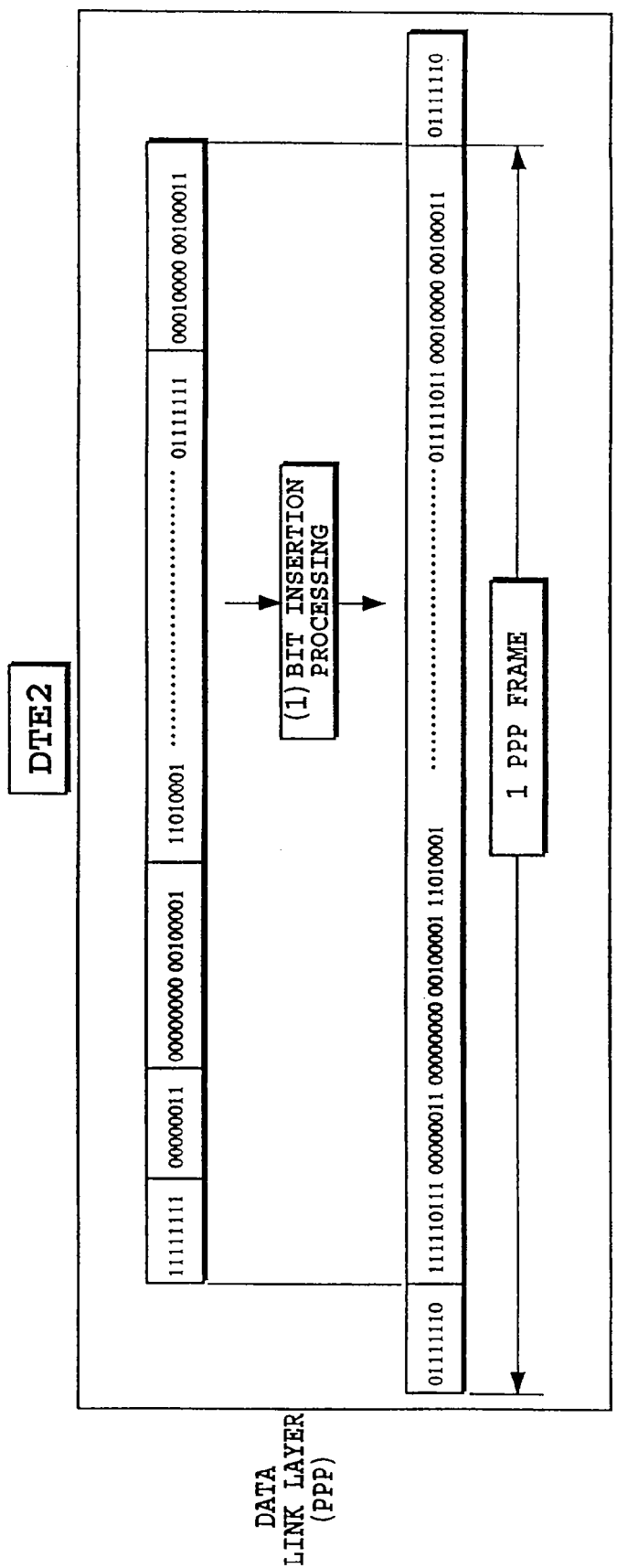
FIG. 15 is a diagram for explaining bit insertion.

FIG. 15 is a diagram for explaining bit insertion. Example of performing octet insertion in DTE 2 is described in FIG. 9, when bit insertion is performed in DTE 2, operation is as shown, for example, in FIG. 15. In the example of FIG. 15, bit insertion is performed, when five "1"s continue to data other than flag, by inserting "0" after that. Since bit deletion is the reverse processing of bit insertion, in bit deletion, when five "1"s continue to data other than flag, "0" after that is deleted.

As described above, with the present invention, during communication according to PPP, in a section not requiring octet/bit insertion, the octet/bit insertion is inhibited, so that the data transmission amount can be reduced, and the throughput be improved. When the data transmission amount can be reduced, the users can be provided with various services at low cost.

Third Embodiment

Figure 17:
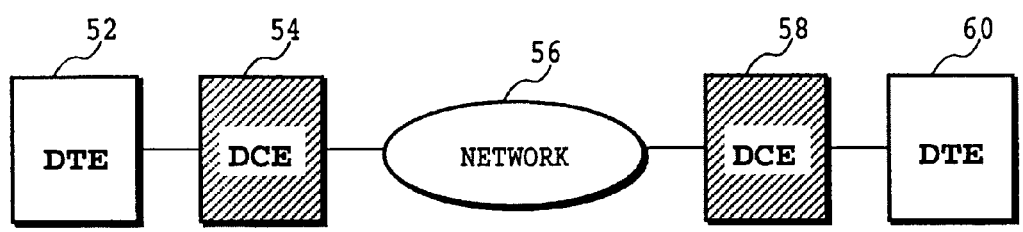
FIG. 17 is a diagram showing a communication example.
Figure 18:
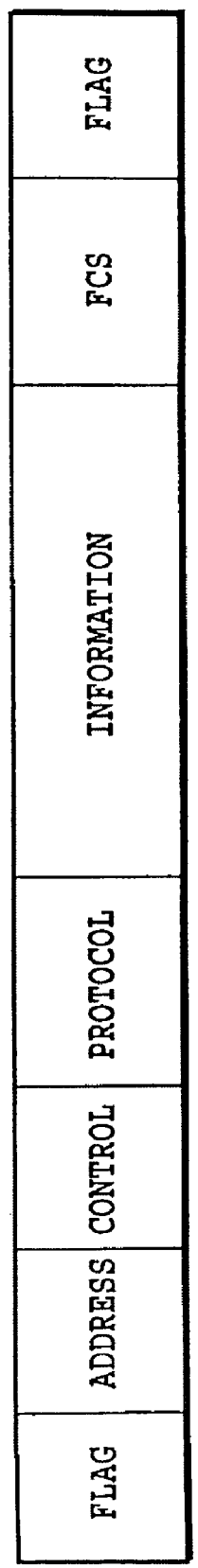
FIG. 18 is an explanation diagram showing field construction of PPP frame.
Figure 19:
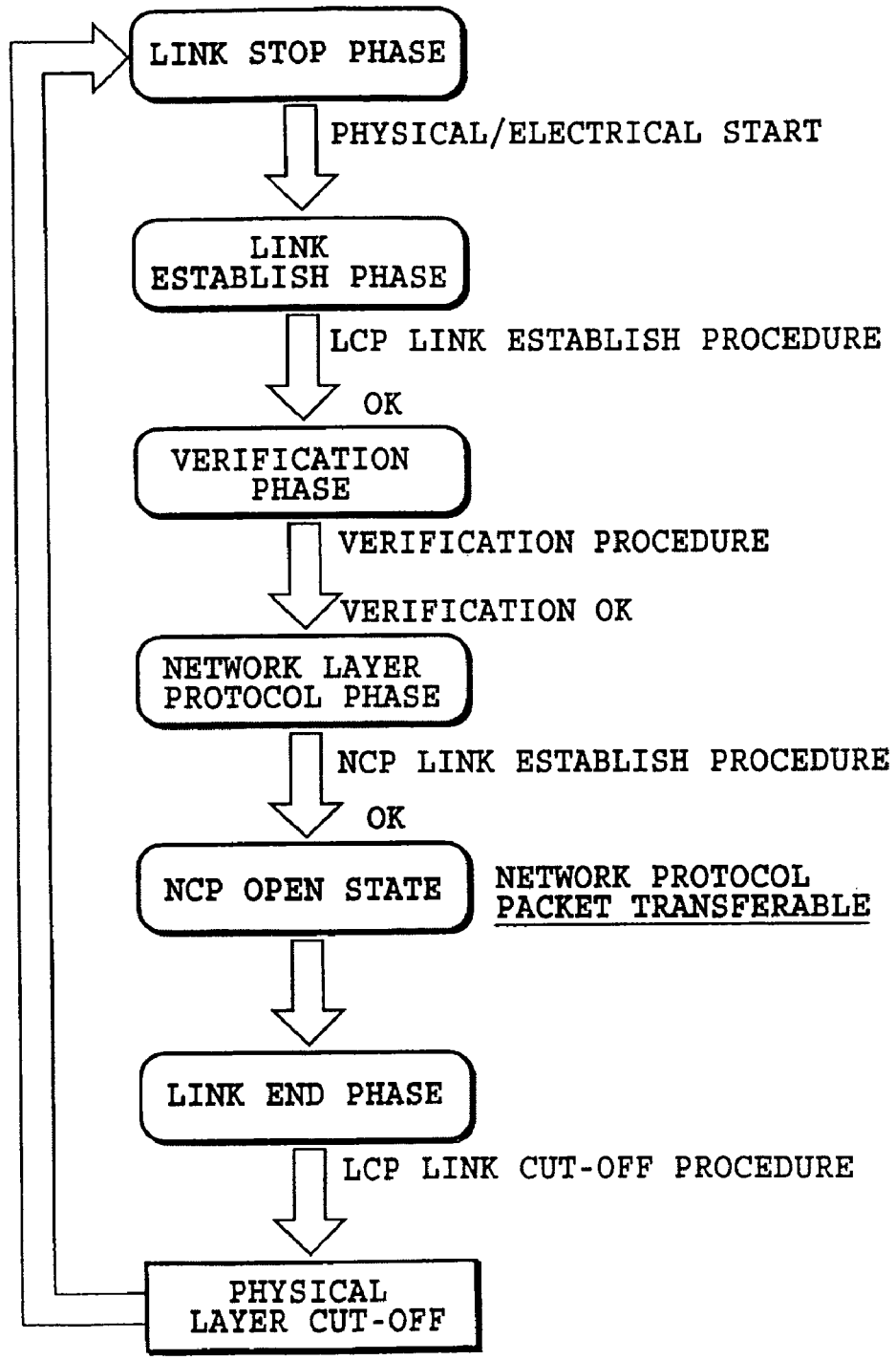
FIG. 19 is an explanation diagram showing outline of PPP procedure.
Figure 20:
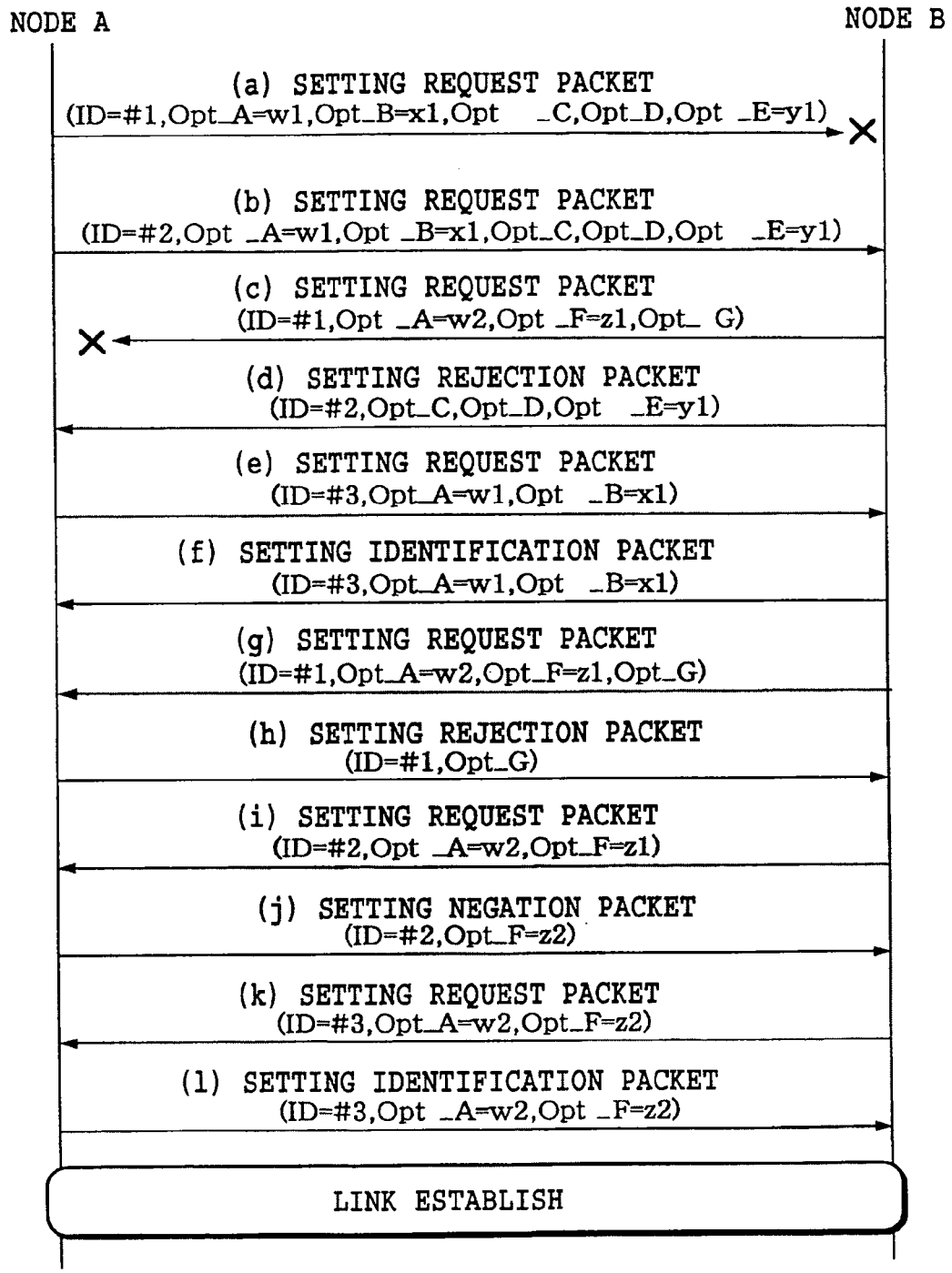
FIG. 20 is a sequence diagram showing a PPP link establish sequence example.
Figure 23:
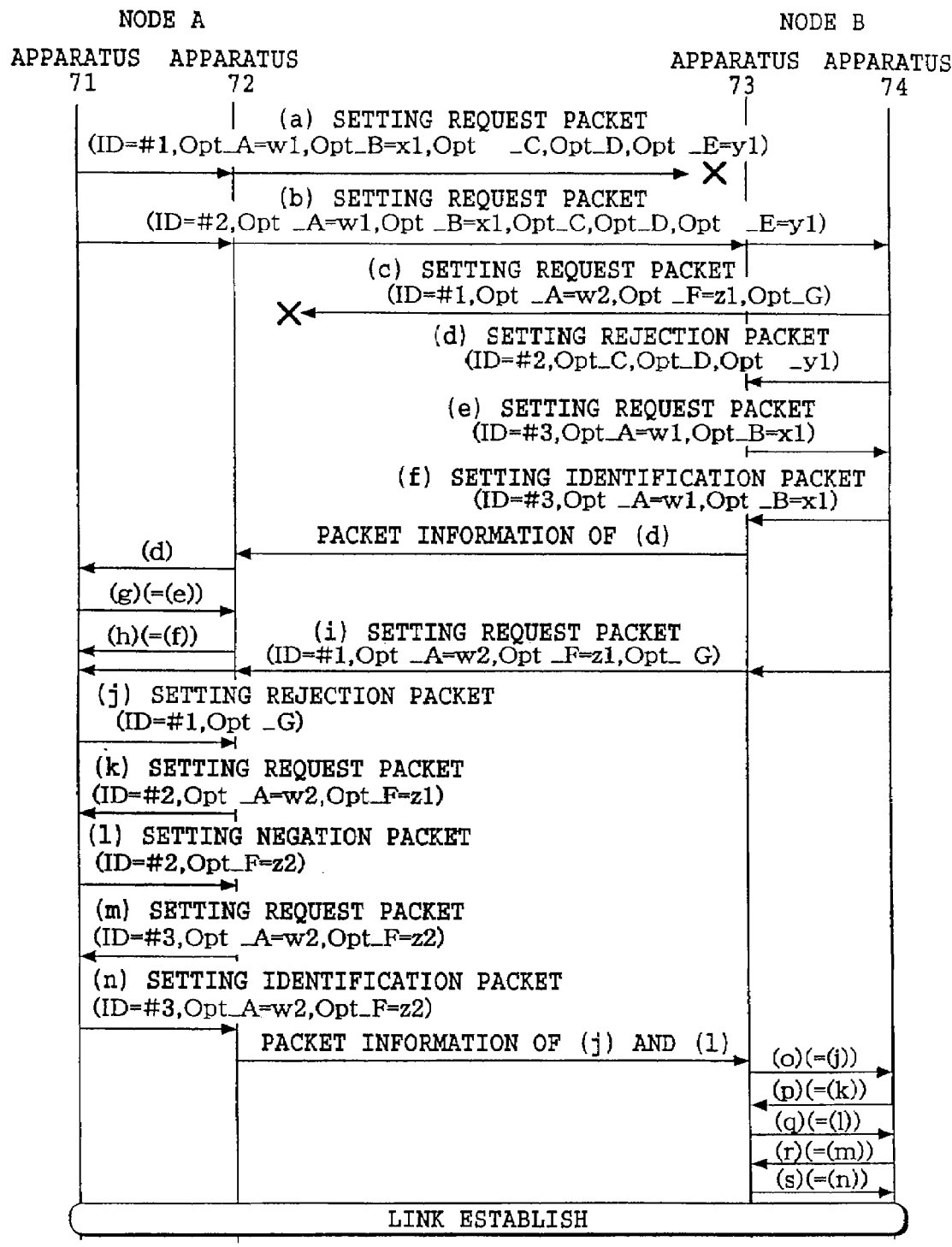
FIG. 23 is a sequence diagram when the present invention is applied to the link establish sequence example of FIG. 20.

FIG. 23 shows a sequence diagram when the present invention is applied to LCP or NCP link establish sequence example of FIG. 20. A (communication) apparatus 71 and a (communication) apparatus 72 belong to node A, and a (communication) apparatus 73 and a (communication) apparatus 74 to node B, which may be physically different apparatus or same apparatus. Between the apparatus and the apparatus 73 is connected with a communication line. For example, DTE 2 of FIG. 17 can be corresponded to the apparatus 71, DCE 4 to the apparatus 72, DEC 8 to the apparatus 73, and DTE 10 to the apparatus 74, whereby a redundant packet between DCE 4 and DCE-8 can be deleted.

The procedures will be described below.

(a) A setting request packet was transmitted from the apparatus 71, passed through the apparatus 72, and disappeared before arrival to node B.

(b) The apparatus 71, since a response packet to the setting request packet of (a) is not received for a certain period of time, transmitted again the setting request packet. In this case, only the ID value was set to a value different from the setting request packet of (a).

(c) A setting request packet was transmitted from the apparatus 74, passed through the apparatus 73, and disappeared before arrival to node A.

(d) The apparatus 74, to the setting request packet of (b) received through the apparatus 73, since Opt_C, Opt_D and Opt_E cannot be recognized, in a setting rejection packet made a response including these options.

(e) The apparatus 73 did not transfer the setting rejection packet of (d) to the apparatus 72, removed Opt_C, Opt_D and Opt_E to produce a setting request packet with changed 10 value and transmitted to the apparatus 74.

(f) The apparatus 74, because all options in the received setting request packet of (e) and these values are all tolerable, made a response in a setting identification packet. The apparatus 73, when receiving the setting identification packet from the apparatus 74, transmits only information included in the packet of (d) to the apparatus 72. As in the present-example, when the setting identification packet was received after receiving the setting rejection packet or the setting negation packet from the apparatus 74, that setting identification packet is terminated. However, when the setting identification packet was received while not receiving the setting rejection packet or the setting negation packet from the apparatus 74, that setting identification packet is not terminated. In this case, that the setting identification packet is simply received is notified to the apparatus 72 (for example, by transmitting the setting identification packet).

(g) The apparatus 72 transmits the setting rejection packet produced from information included in the packet of (d) to the apparatus 71. The apparatus 71, on receiving the setting rejection packet from the apparatus 72, removes Opt_C, Opt_D and Opt_E and transmits the setting request packet with changed ID value. The packets of (e) and (g), even though differing in ID value, are setting request packets having the same options.

(h) The apparatus 72 does not transfer the setting request packet of (g) to the apparatus 73, but makes a response in setting identification packet. The packets of (f) and (h), even though differing in ID value, are setting identification packets having the same options.

(i) The apparatus 74, since a response packet to the setting request packet of (c) is not received for a certain period of time, transmits again settin9-request packet of the same format as the setting request packet of (c).

(j) The apparatus 71, since option Opt_G of the received setting request packet of (i) cannot be recognized, in the setting rejection packet makes a response including the option.

(k) The apparatus 72 does not transfer the setting rejection packet of (j) to the apparatus 73, transmits the setting request packet with the option Opt_G removed and the ID value changed to the apparatus 71.

(l) The apparatus 71, since the value w2 of the option Opt_A in the received setting request packet of (k) is tolerable, however, it is tolerable if the value of the option Opt_F is not z1 but z2, in the setting negation packet the value of the option Opt_F is changed to z2 and transmitted.

(m) The apparatus 72 does not transfer the setting negation packet of (l) to the apparatus 71, but changes the value of the option Opt_F to z2, and transmits the setting request packet to the apparatus 71.

(n) The apparatus 71, since all options in the received setting request packet of (m) can be recognized and these values are all tolerable, makes a response in the setting identification packet. The apparatus 72, on receiving the setting identification packet, transmits only information included in the packets of (j) and (l) to the apparatus 73.

(o) The apparatus 73, on receiving information included in the packets of (j) and (l) from the apparatus 72, first transmits setting rejection packet produced from information of (j) to the apparatus 74. The packets of (j) and (o) are setting rejection packets having the same options.

(p) The apparatus 74 removes the option Opt_G in the received setting rejection packet of (0), and transmits setting request packet with changed ID value. The packets of (k) and (p), even though differing in ID value, are setting request packets having the same options.

(q) The apparatus 73 does not transfer the setting request packet of (p) to the apparatus 72, since it is known from information included in the packet of (l) that the value w2 of the option Opt_A is tolerable, however, it is tolerable if the value of the option Opt_F is not z1 but z2, in the setting negation packet changes the value of the option Opt_F to z2 and transmits it to the apparatus 74. The packets of (l) and (q), even though differing in ID value, are setting negation packets having the same options.

(r) The apparatus 74 changes the value of the option Opt_F in the received setting negation packet of (q) to z2 and transmits setting request packet. The packets of (m) and (r), even though differing in ID value, are setting request packets having the same options.

(s) The apparatus 73 does not transmit the setting request packet of (r) to the apparatus 72, since all options in the setting request packet can be recognized and these values are all tolerable, in the setting identification packet makes a response to the apparatus 74. The packets of (n) and (s), even though differing in ID value, are setting identification packets having the same options.

Figure 21:
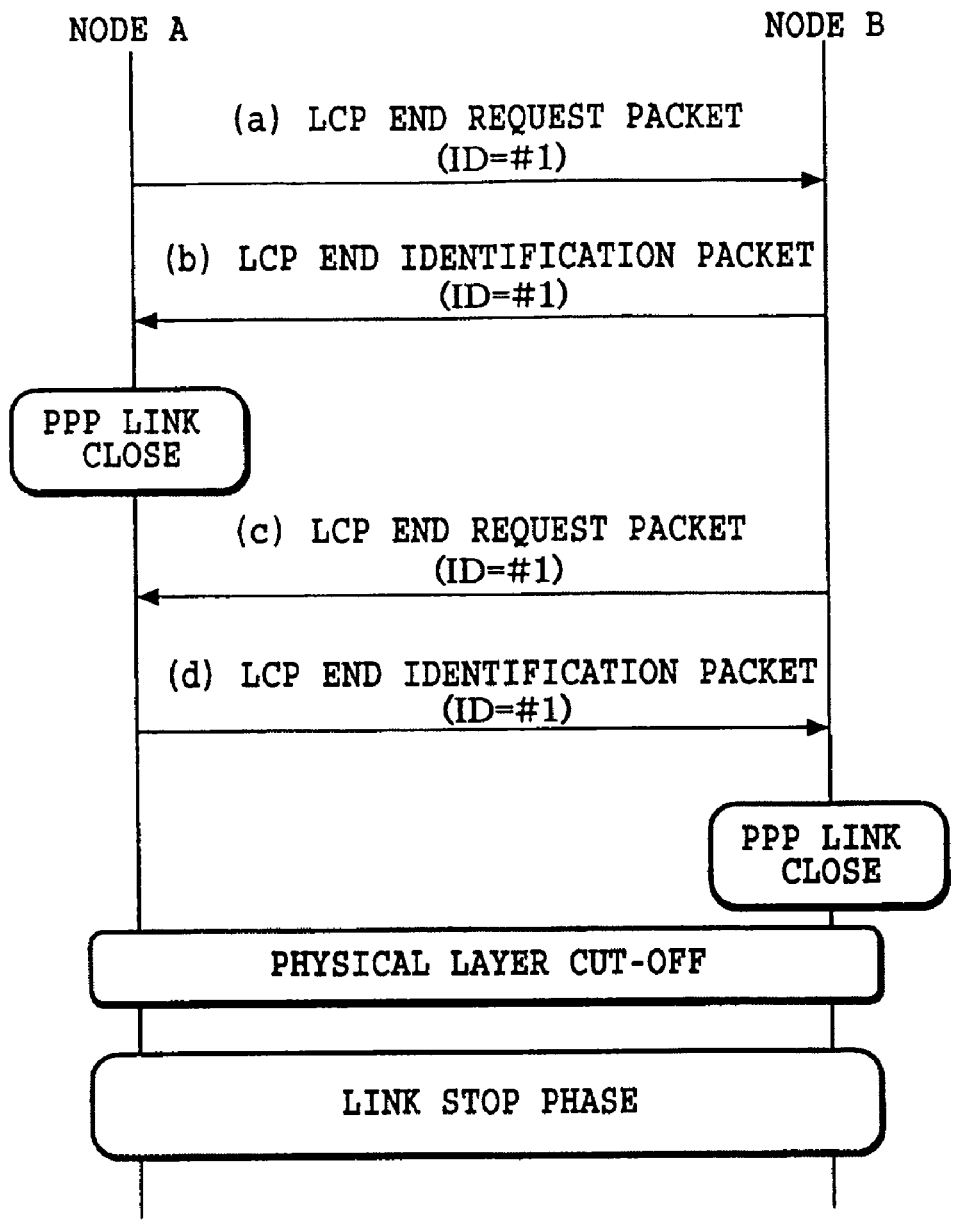
FIG. 21 is a sequence diagram showing a PPP link cut-off sequence example.
Figure 24:
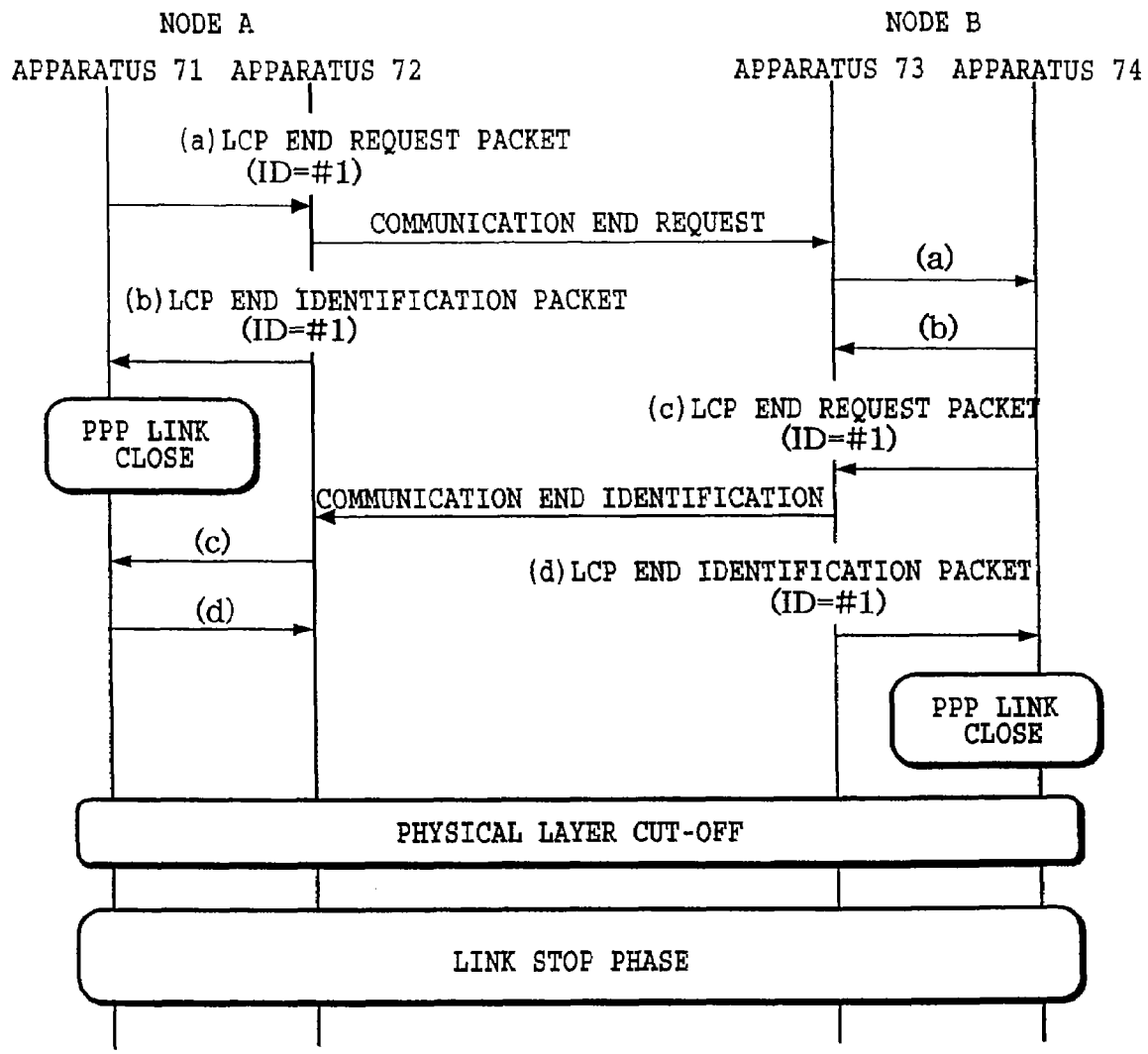
FIG. 24 is a sequence diagram when the present invention is applied to the link cut-off sequence example of FIG. 21.

FIG. 24 shows a sequence diagram when the present invention is applied to the LCP link cut-off sequence example of FIG. 21. The procedures will be described below.

(a) The apparatus 71 transmits end request packet to request link release. The apparatus 72, on receiving the end request packet, transmits a communication end request signal to the apparatus 73.

(b) The apparatus 73 on receiving the communication end request signal, produces an end request packet and transmits it to the apparatus 74. The apparatus 72 on receiving the end request packet from the apparatus 71, transmits end identification packet to the apparatus 71. The apparatus 71 receiving the end identification packet becomes a link close state. On the other hand, the apparatus 74 receiving the end request packet from the apparatus 73 transmits end identification packet. The apparatus 73 does not transfer the end identification packet to the apparatus 72.

(c) The apparatus 74, after the passage of a time from the end identification packet transmission, transmits end request packet. The apparatus 73, on receiving the end request packet, transmits a communication end identification signal to the apparatus 72. The apparatus 72 receiving the communication end identification signal produces end request packet and transmits it to the apparatus 71.

(d) The apparatus 73 receiving the end request packet transmits end identification packet to the apparatus 74. The apparatus 74 receiving the end identification packet transfers to the link close state, and after cutting the physical link, becomes a link stop phase state. On the other hand, the apparatus 71 receiving the end request packet from the apparatus 72 transmits end identification packet, and after cutting the physical link, becomes link stop phase state. The apparatus 72 does not transfer the end identification packet to the apparatus 73.

Figure 22:
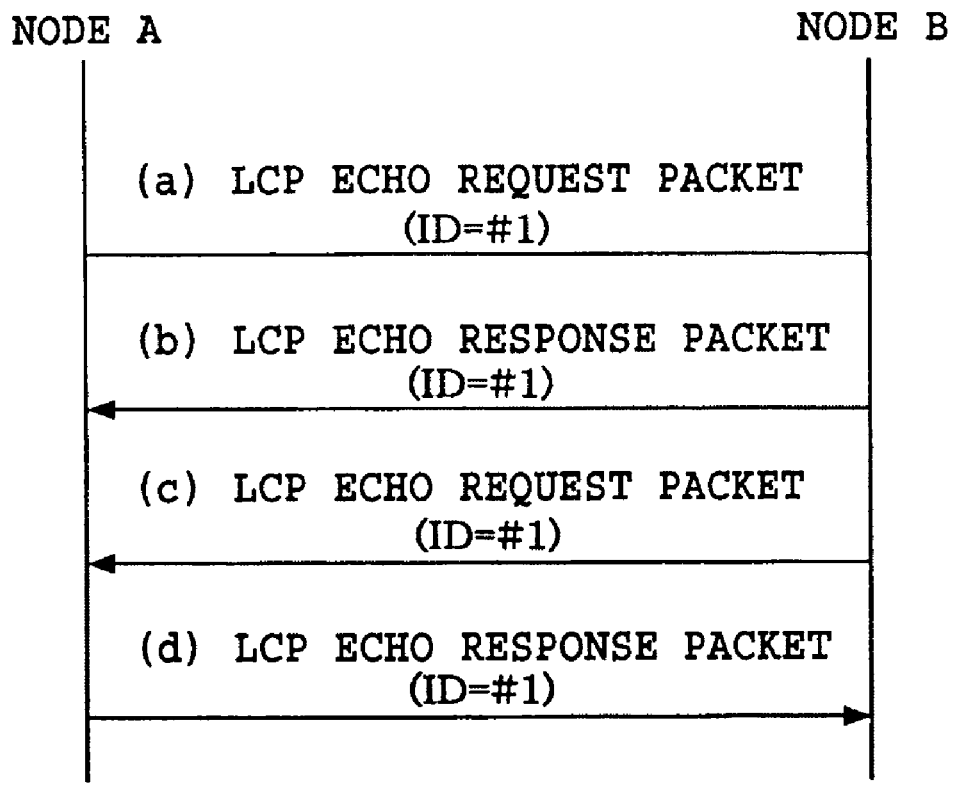
FIG. 22 is a sequence diagram showing a PPP keep alive operation.
Figure 25:
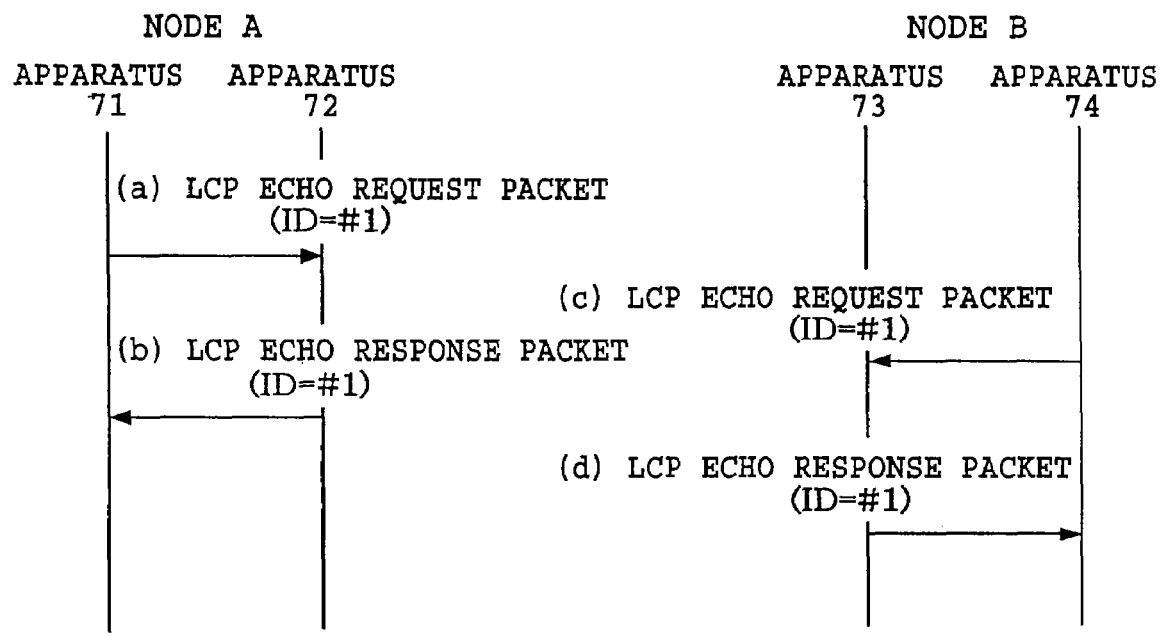
FIG. 25 is a sequence diagram when the present invention is applied to the keep alive sequence example of FIG. 22.

FIG. 25 shows a sequence diagram when the present invention is applied to the LCP keep alive sequence example of FIG. 22. The procedures will be described below.

(a) The apparatus 71, to confirm whether or not the LCP link is maintained, transmits LCP echo request packet.

(b) The apparatus 72 does not transfer the received LCP echo request packet of (a) to the apparatus 73 but transmits LCP echo response packet to the apparatus 71.

(c) The apparatus 74, to confirm whether or not the LCP link is maintained, transmits LCP echo request packet.

(d) The apparatus 73 does not transfer the received LCP echo request packet of (c) to the apparatus 72 but transmits LCP echo response packet to the apparatus 74.

As described above, no signal is transferred between the apparatus 72 and the apparatus 73.

In the present embodiment, an example where the present invention is applied to communication according to PPP protocol, however, the present invention can also be applied to communication based on similar protocol.

As described above, with the present invention, control packet on the communication line can be reduced.

With this configuration, redundant packets, for example, in end-to-end PPP link establish procedure, cut-off procedure, and PPP link continuity identification procedure are terminated in the same node, whereby control packet amount transferred on the communication line can be reduced, communication fees and communication cost be reduced, and subscriber capacity be increased in association with reduction of communication traffic amount.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A communication method in a third communication apparatus of a first node located between a first communication apparatus of the first node and a second communication apparatus of a second node, the first communication apparatus and the second communication apparatus performing data communication based on PPP, the communication method comprising the steps of:

intermediating a setting request packet from the second communication apparatus to the first communication apparatus;

receiving a setting rejection packet or a setting negation packet from the first communication apparatus;

producing a setting request packet according to the setting rejection packet or the setting negation packet; and transmitting the produced setting request packet to the first communication apparatus;

wherein the third communication apparatus terminates a setting identification packet when the third communication apparatus receives the setting identification packet after intermediating the setting request packet from the second communication apparatus to the first communication apparatus and receiving the setting rejection packet or the setting negation packet from the first communication apparatus, and the third communication apparatus does not terminate a setting identification packet when the third communication apparatus receives the setting identification packet without receiving the setting rejection packet or the setting negation packet from the first communication apparatus after intermediating the setting request packet from the second communication apparatus to the first communication apparatus.

2. The communication method as claimed in claim 1, wherein the third communication apparatus is a mobile station.

* * * * *